(12) United States Patent
Yamasaki

(10) Patent No.: US 7,755,845 B2
(45) Date of Patent: Jul. 13, 2010

(54) ZOOM LENS SYSTEM AND CAMERA INCLUDING THE SAME

(75) Inventor: Shinji Yamasaki, Utsuniomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/369,639

(22) Filed: Feb. 11, 2009

(65) Prior Publication Data

US 2009/0201591 A1   Aug. 13, 2009

(30) Foreign Application Priority Data

Feb. 12, 2008 (JP) .............................. 2008-030298

(51) Int. Cl.
  *G02B 15/14* (2006.01)
(52) U.S. Cl. ..................................... 359/687
(58) Field of Classification Search .................. 359/687
  See application file for complete search history.

(56) References Cited

U.S. PATENT DOCUMENTS 5,341,243 A * 8/1994 Okuyama et al. ........... 359/687
6,118,593 A   9/2000 Tochigi
6,473,231 B2  10/2002 Hamano et al.

FOREIGN PATENT DOCUMENTS

| JP | 2000-89116 | 3/2000 |
|---|---|---|
| JP | 2000227548 | 8/2000 |
| JP | 2002182109 | 6/2002 |
| JP | 2002-287027 | 10/2002 |
| JP | 2006-227644 A | 8/2006 |

* cited by examiner

*Primary Examiner*—William C Choi
(74) *Attorney, Agent, or Firm*—Canon USA Inc IP Div

(57) ABSTRACT

A zoom lens system includes a first lens unit having a positive optical power, a second lens unit having a negative optical power which moves during zooming, a third lens unit having a positive optical power which does not move for zooming, and a fourth lens unit having a positive optical power which moves during zooming. The first lens unit, the second lens unit, the third lens unit, and the fourth lens unit are arranged in order from the object side to the image side. A back focus of the zoom lens system and a focal length of the third lens unit are adequately set.

13 Claims, 17 Drawing Sheets

ZOOM LENS SYSTEM AND CAMERA INCLUDING THE SAME

BACKGROUND OF THE INVENTION

1. Field of the Invention

The present invention relates to zoom lens systems. More particularly, the present invention relates to a zoom lens system suitable for use as an imaging lens included in a camera, such as a video camera, a surveillance camera, a digital still camera, a broadcast camera, and a silver-halide film camera.

2. Description of the Related Art

Recently, cameras, such as video cameras, digital still cameras, broadcast cameras, and silver-halide film cameras, including solid-state image pickup devices have become smaller with increased functionality.

Accordingly, demand has increased for small, high-zoom-ratio zoom lens systems having a small length for use in imaging optical systems of the cameras.

A four-unit zoom lens system including a first lens unit having a positive refractive power, a second lens unit having a negative refractive power, a third lens unit having a positive refractive power, and a fourth lens unit having a positive refractive power are arranged in order from the object side to the image side is known as a zoom lens system that complies with the above-mentioned demand.

An example of a four-unit zoom lens system is a so-called rear-focus zoom lens system in which the magnification is varied by moving the second lens unit and image-plane variation caused as the magnification is varied is compensated for by the fourth lens unit (refer to, for example, Japanese Patent No. 2002-182109, Japanese Patent Laid-Open No. 2002-287027, Japanese Patent No. 2000-89116 (corresponding to U.S. Pat. No. 6,118,593), and Japanese Patent Laid-Open No. 2000-227548.

In a rear-focus zoom lens system, an effective diameter of the first lens unit is generally small compared to that in a zoom lens system in which focusing is performed by moving the first lens unit. Therefore, the size of the overall lens system can be reduced. However, large variations in aberrations occur during focusing and it is difficult to obtain high optical performance over the entire object distance from an object at infinity to an object at a close distance.

Therefore, to obtain a small zoom lens system having a high zoom ratio, it is important to adequately set the zoom type, a refractive power of each lens unit, and the lens structure of each lens unit.

In particular, in the above-described four-unit rear-focus zoom lens system, it is important to adequately set the lens structure of the third lens unit and a back focus of the entire system.

SUMMARY OF THE INVENTION

The present invention provides a small zoom lens system having a new structure which has a high zoom ratio and which provides high optical performance over the entire zoom range.

A zoom lens system according to an aspect of the present invention includes a first lens unit having a positive optical power, a second lens unit having a negative optical power which moves during zooming, a third lens unit having a positive optical power which does not move for zooming, and a fourth lens unit having a positive optical power which moves during zooming, wherein the first lens unit, the second lens unit, the third lens unit, and the fourth lens unit are arranged in order from an object side to an image side.

The zoom lens system satisfies the following conditions:

$$10.0 < f3/fw < 26.0$$

$$1.2 < bft/fw < 3.5$$

where fw is a focal length of the zoom lens system at a wide-angle end, f3 is a focal length of the third lens unit at the wide-angle end, and bft is an equivalent air distance of a back focus at a telephoto end.

Further features of the present invention will become apparent from the following description of exemplary embodiments with reference to the attached drawings.

DESCRIPTION OF THE EMBODIMENTS

Zoom lens systems according to embodiments of the present invention and a camera (image pickup apparatus, image-taking device) including a zoom lens system according to at least one of the embodiments will be described below.

Each of the zoom lens systems according to the embodiments of the present invention includes a first lens unit having a positive refractive power (optical power is the reciprocal of focal length), a second lens unit having a negative refractive power, a third lens unit having a positive refractive power, and a fourth lens unit having a positive refractive power in order from the object side to the image side.

The second and fourth lens units move during (for) zooming. The third lens unit does not move for zooming.

Figure 1:
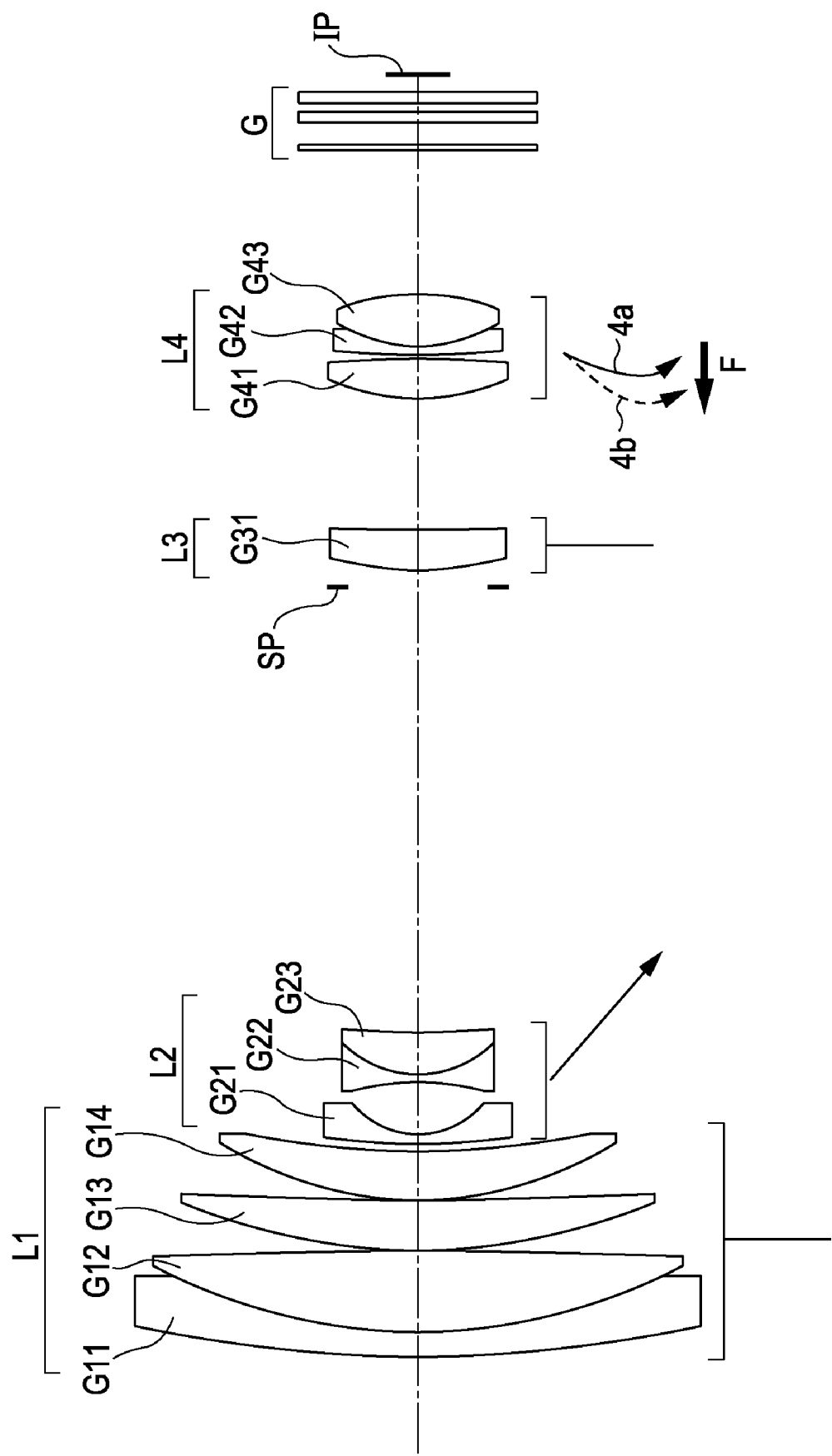
FIG. 1 is a sectional view of a zoom lens system according to a first embodiment at a wide-angle end.

FIG. 1 is a sectional view of a zoom lens system according to a first embodiment of the present invention at a wide-angle end (short-focal-length end).

Figure 2:
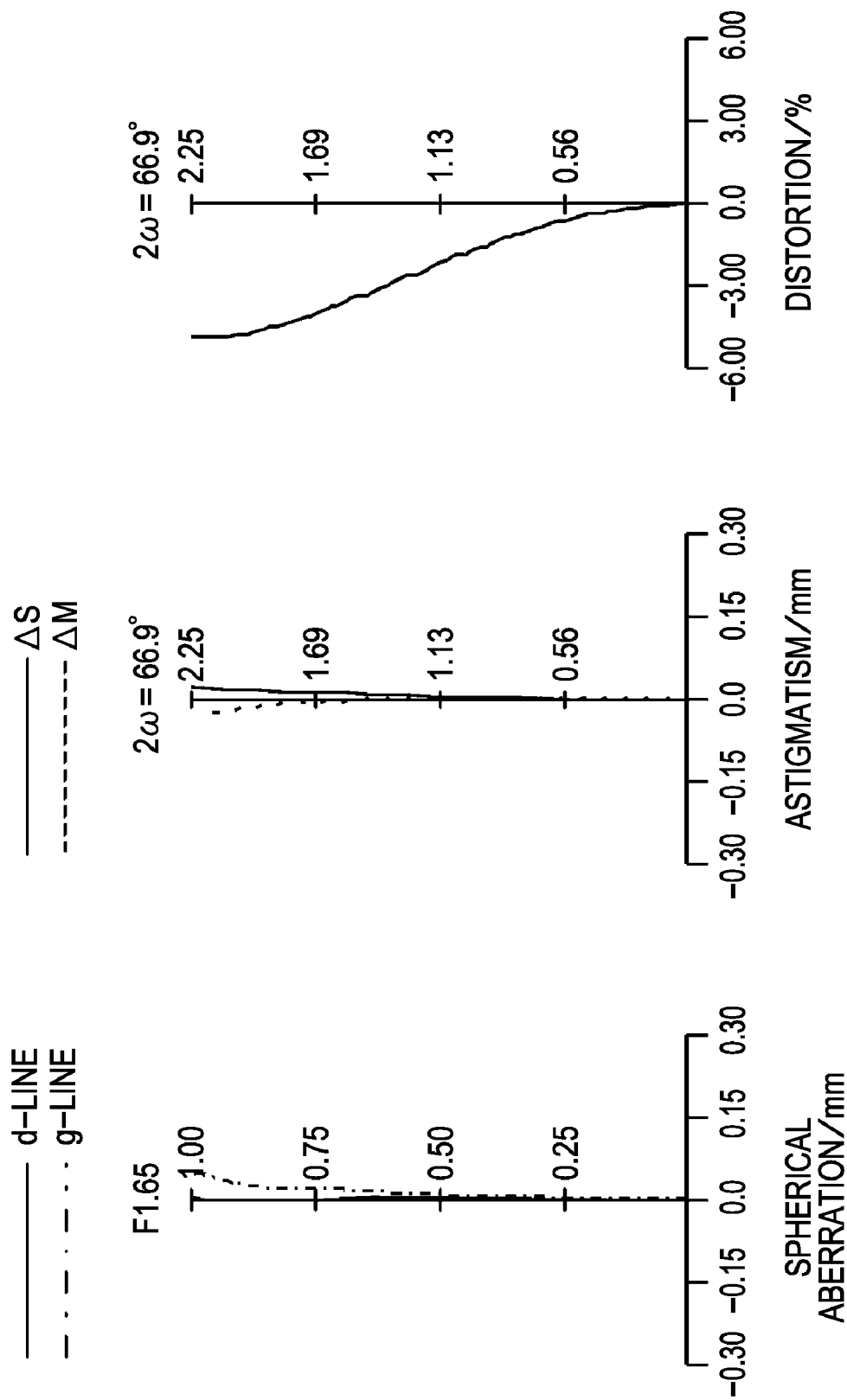
FIG. 2 illustrates aberration diagrams of the zoom lens system according to the first embodiment at the wide-angle end.
Figure 3:
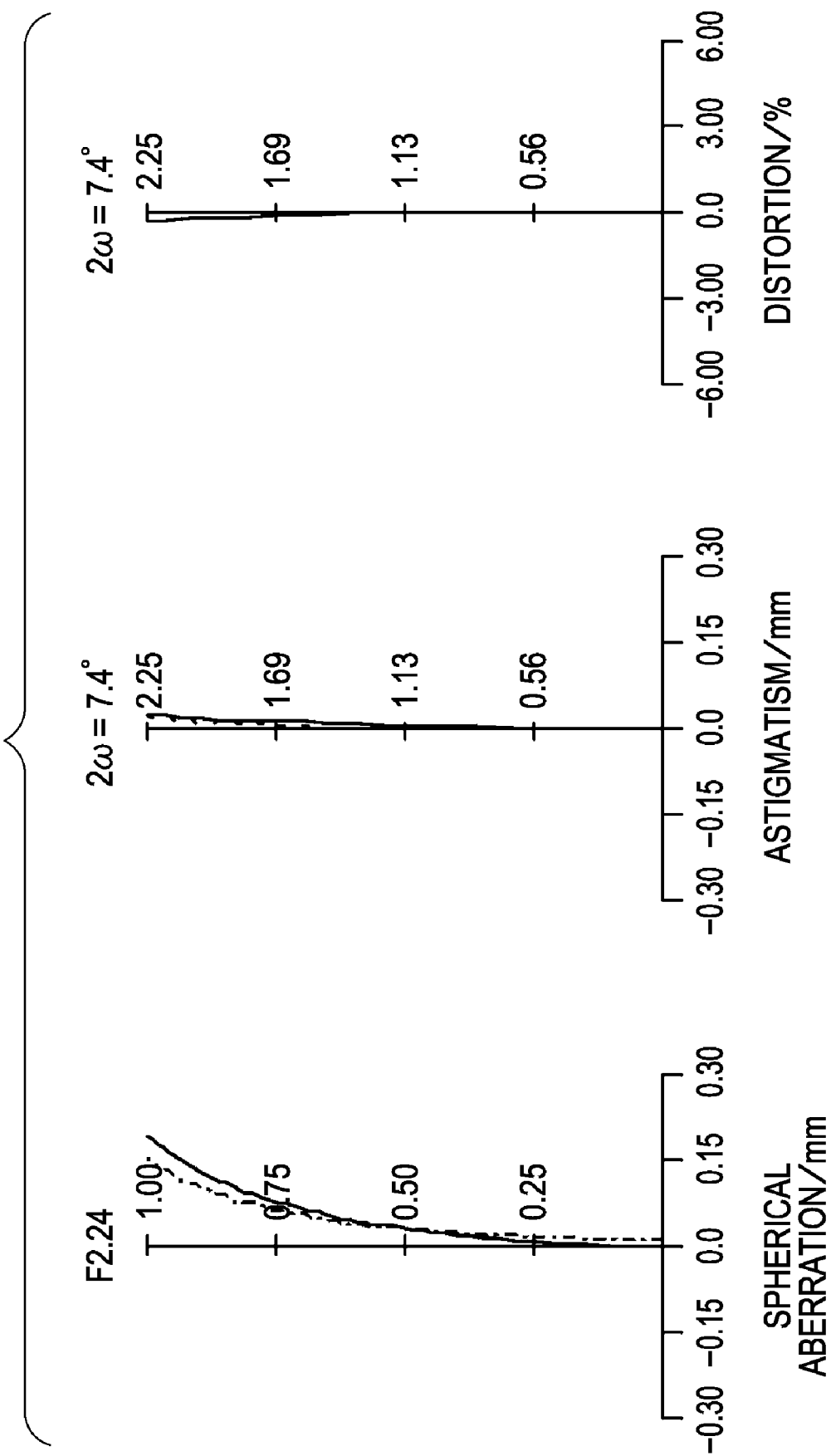
FIG. 3 illustrates aberration diagrams of the zoom lens system according to the first embodiment at an intermediate zooming position.
Figure 4:
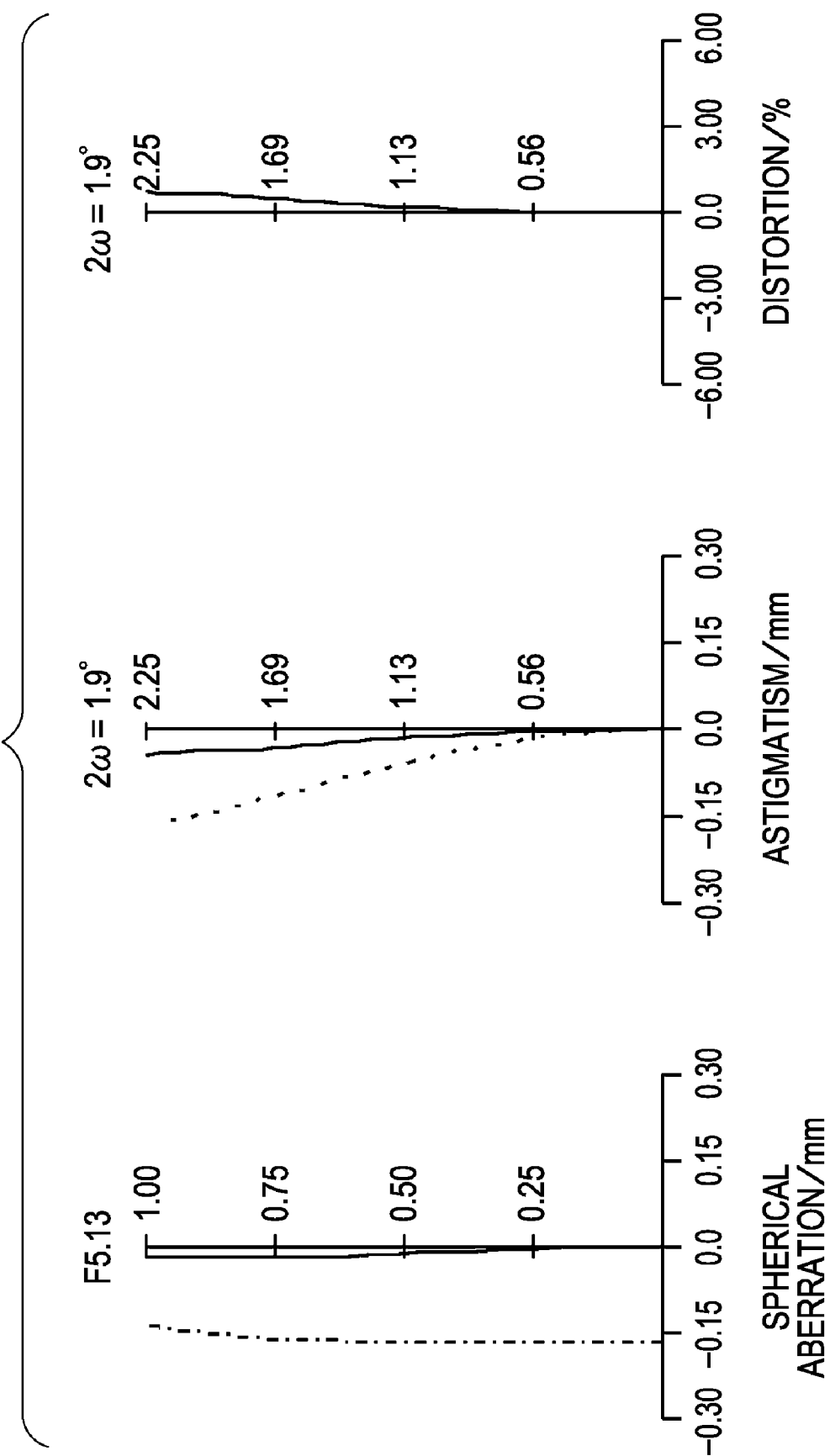
FIG. 4 illustrates aberration diagrams of the zoom lens system according to the first embodiment at a telephoto end.

FIGS. 2, 3, and 4 illustrate aberration diagrams of the zoom lens system according to the first embodiment at the wide-angle end, an intermediate zooming position, and a telephoto end (long-focal-length end), respectively.

Figure 5:
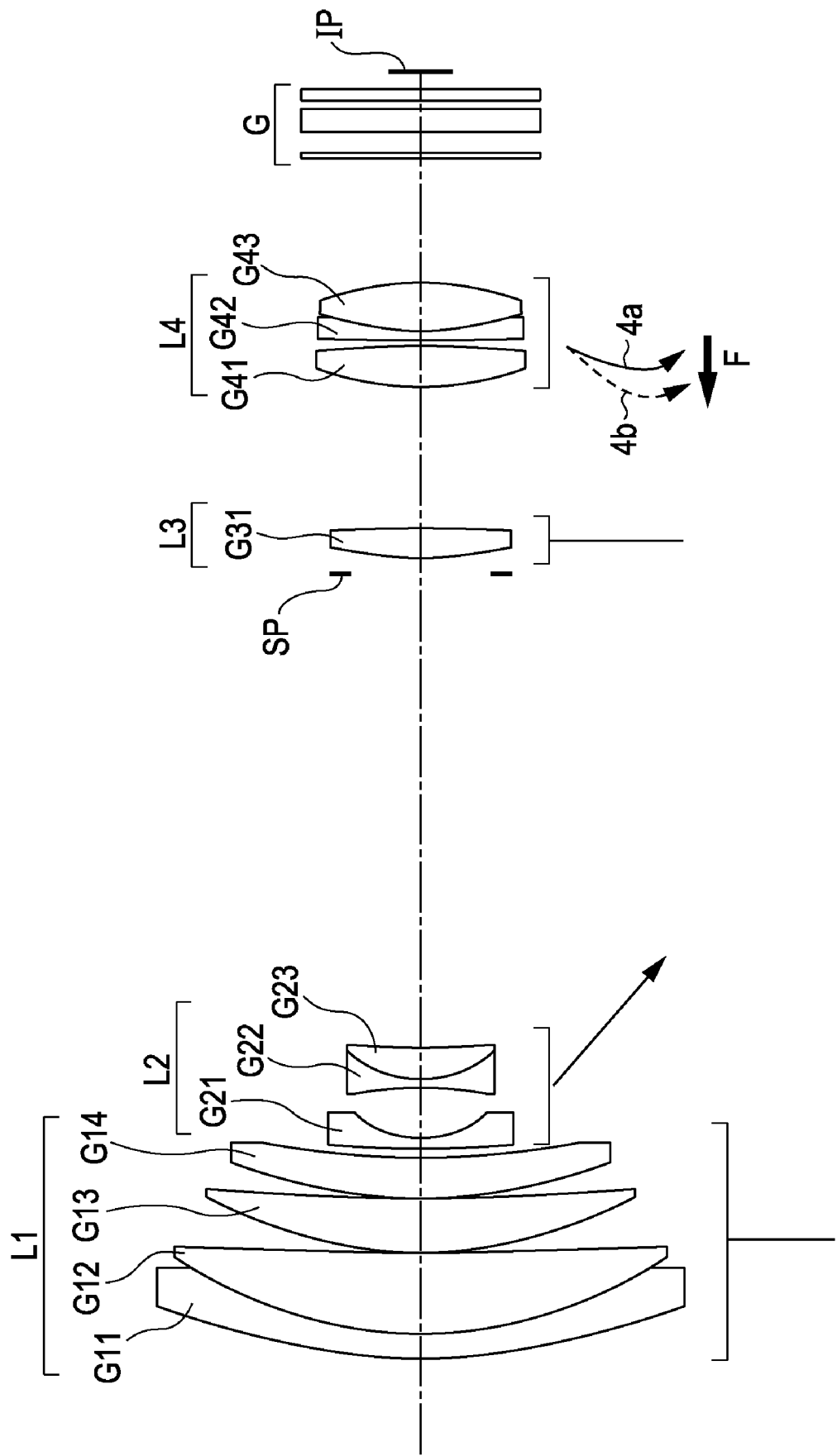
FIG. 5 is a sectional view of a zoom lens system according to a second embodiment at a wide-angle end.
Figure 6:
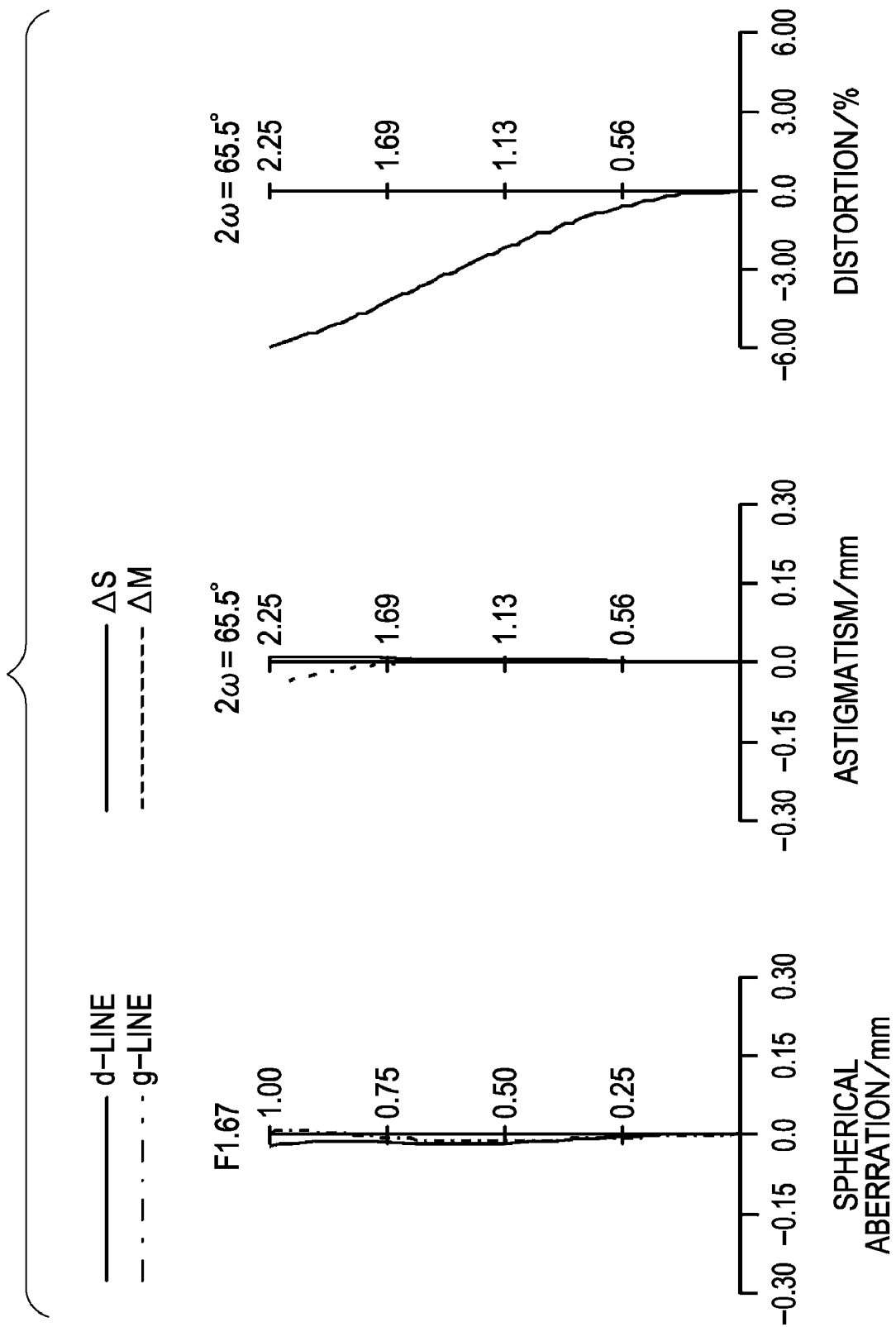
FIG. 6 illustrates aberration diagrams of the zoom lens system according to the second embodiment at the wide-angle end.
Figure 7:
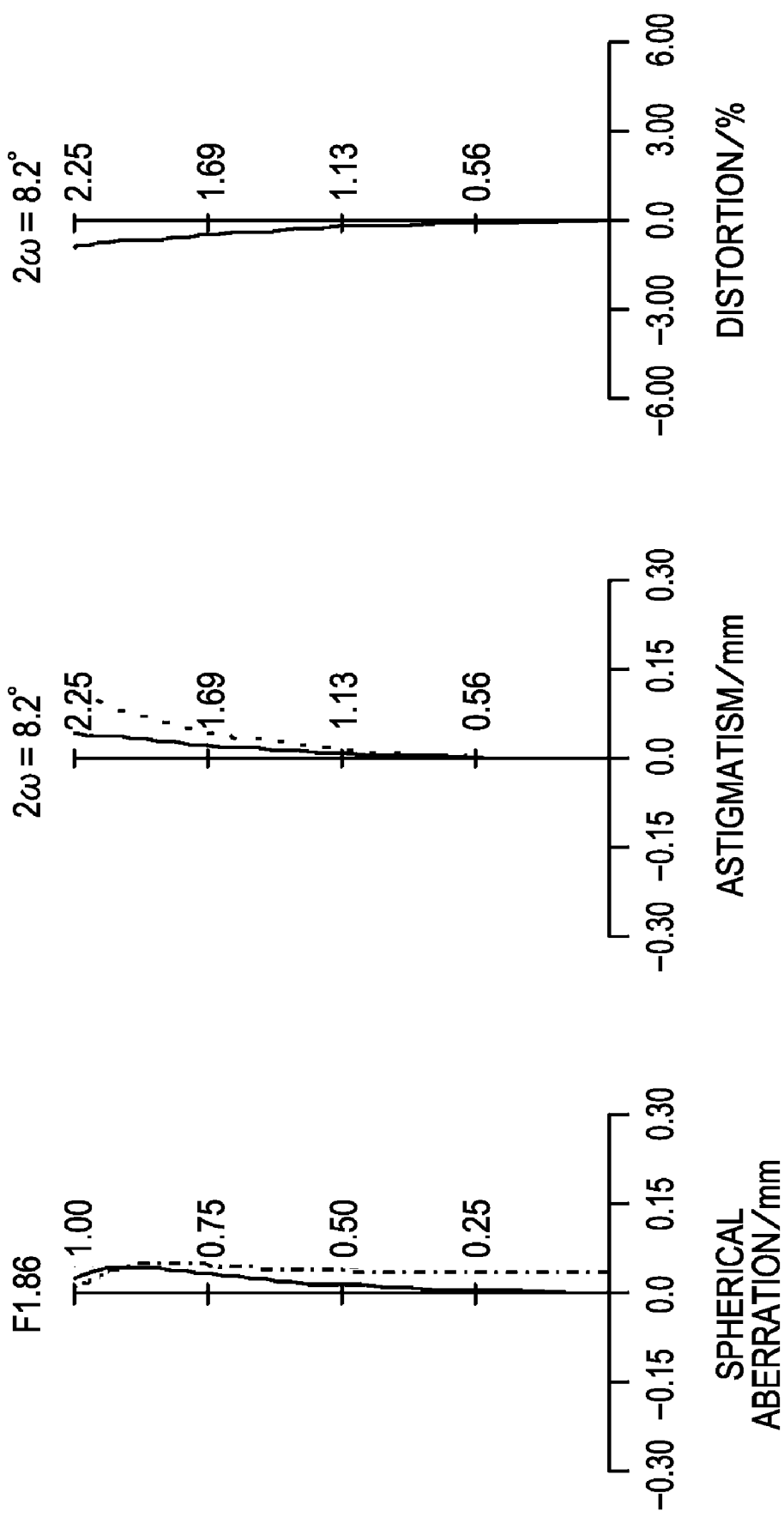
FIG. 7 illustrates aberration diagrams of the zoom lens system according to the second embodiment at an intermediate zooming position.
Figure 8:
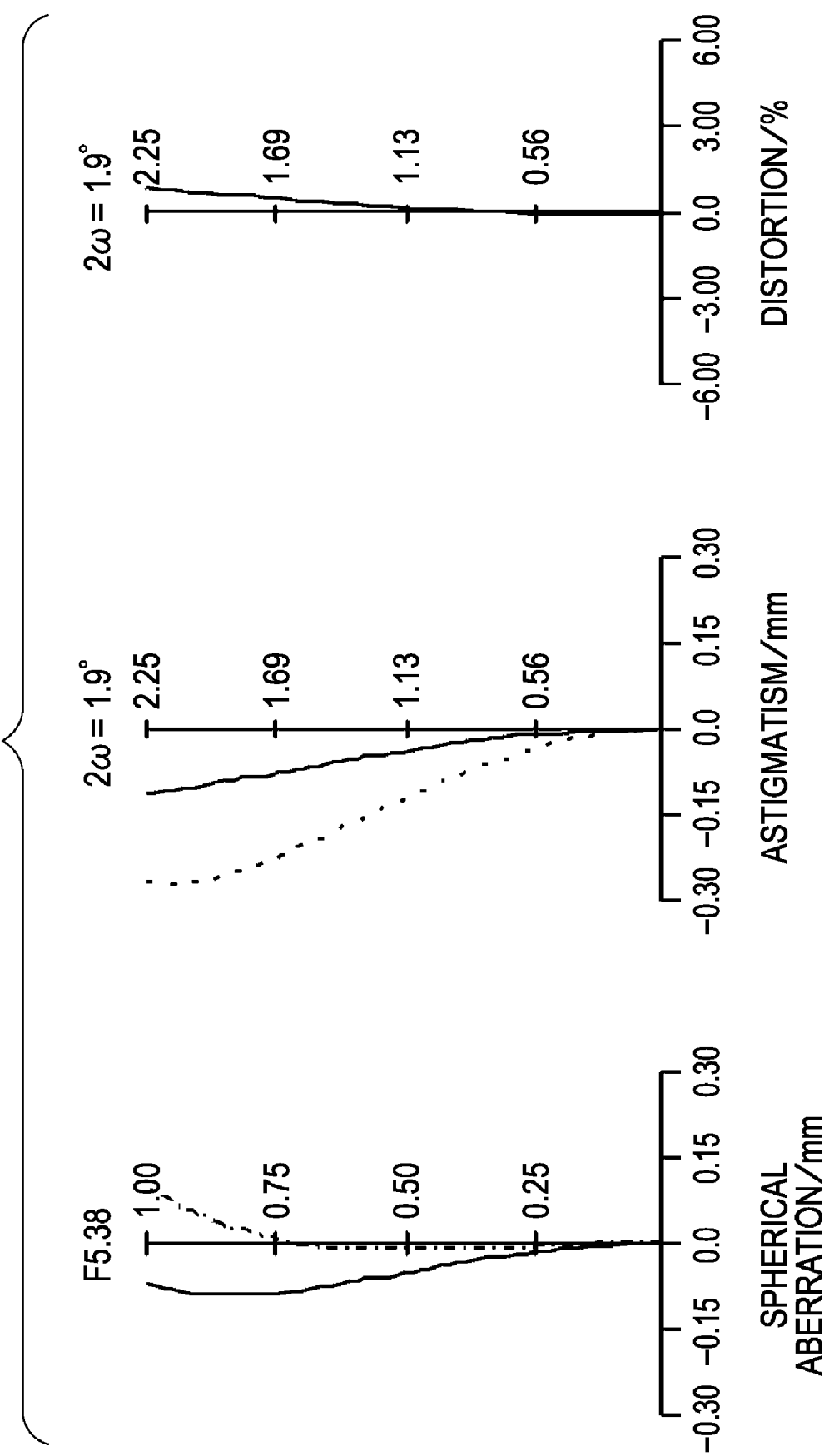
FIG. 8 illustrates aberration diagrams of the zoom lens system according to the second embodiment at a telephoto end.

FIG. 5 is a sectional view of a zoom lens system according to a second embodiment of the present invention at a wide-angle end. FIGS. 6, 7, and 8 illustrate aberration diagrams of the zoom lens system according to the second embodiment at the wide-angle end, an intermediate zooming position, and a telephoto end, respectively.

Figure 9:
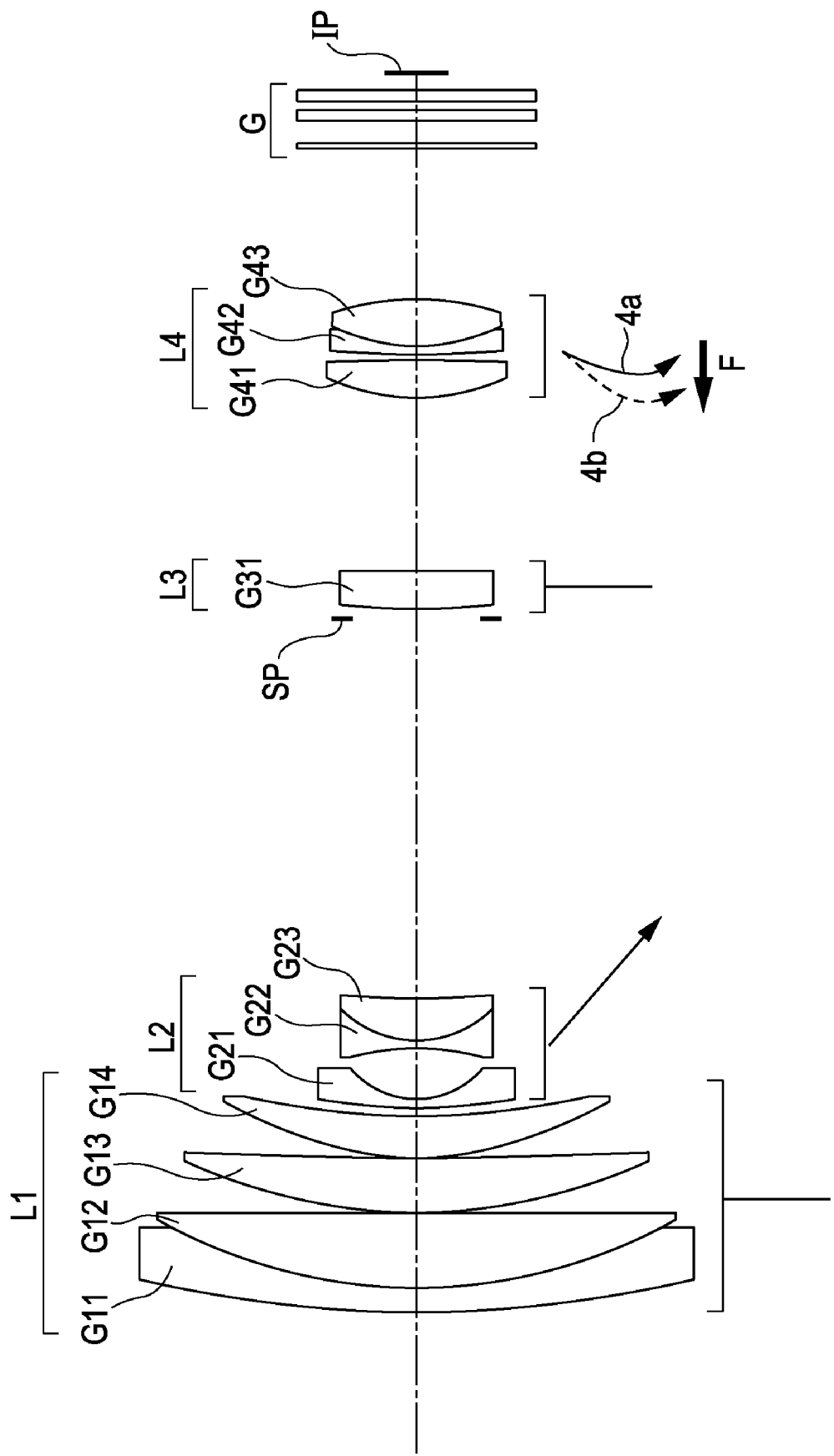
FIG. 9 is a sectional view of a zoom lens system according to a third embodiment at a wide-angle end.
Figure 10:
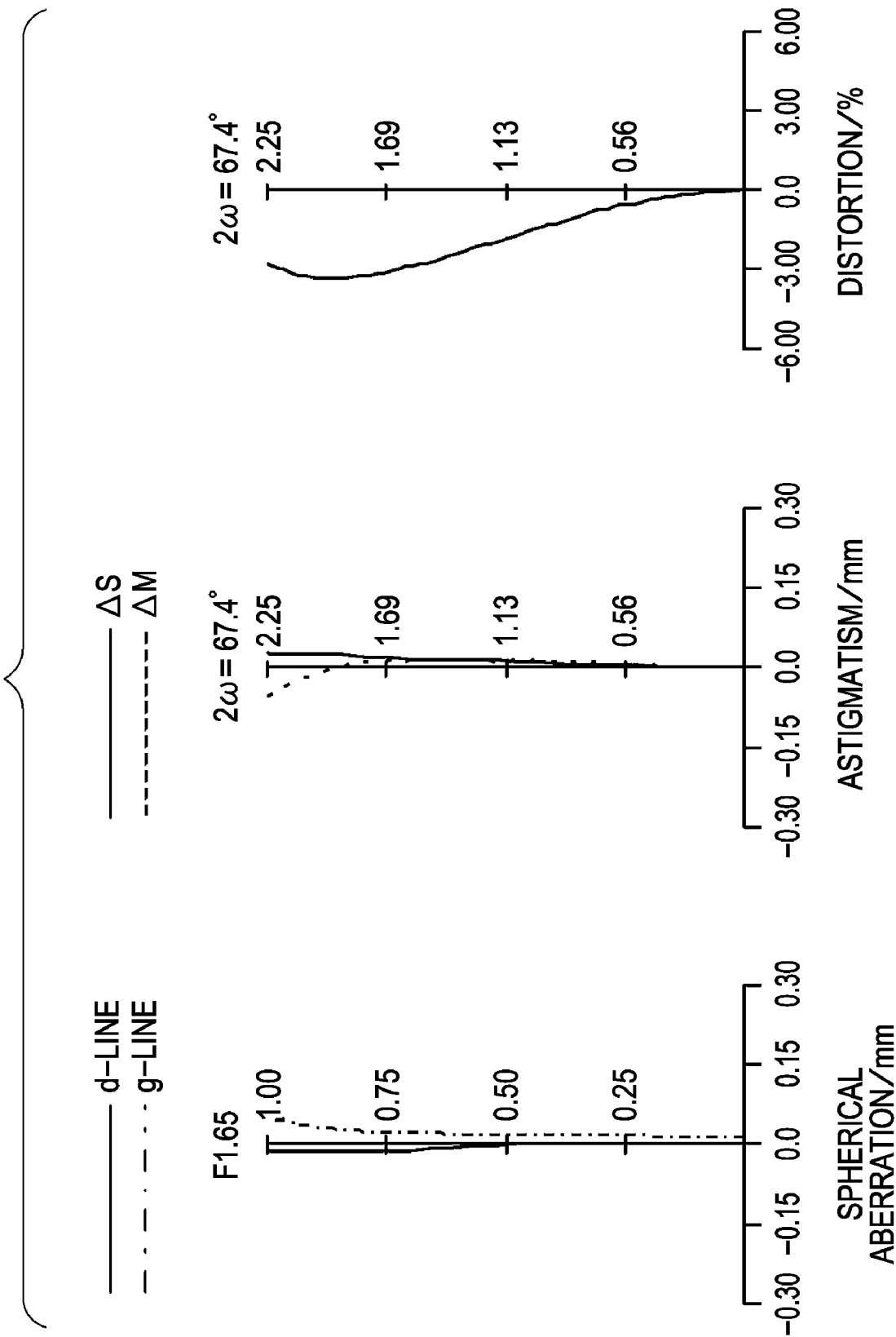
FIG. 10 illustrates aberration diagrams of the zoom lens system according to the third embodiment at the wide-angle end.
Figure 11:
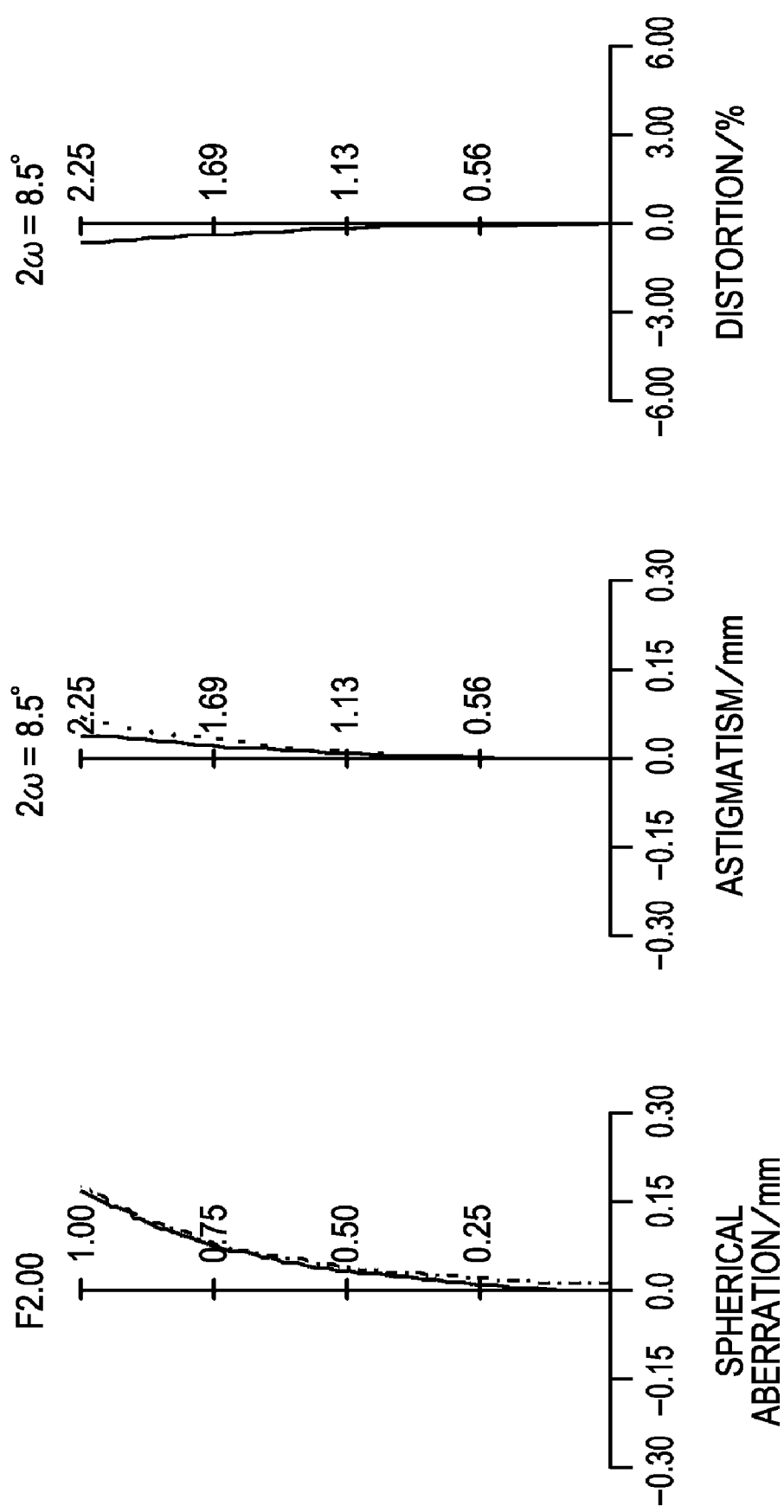
FIG. 11 illustrates aberration diagrams of the zoom lens system according to the third embodiment at an intermediate zooming position.
Figure 12:
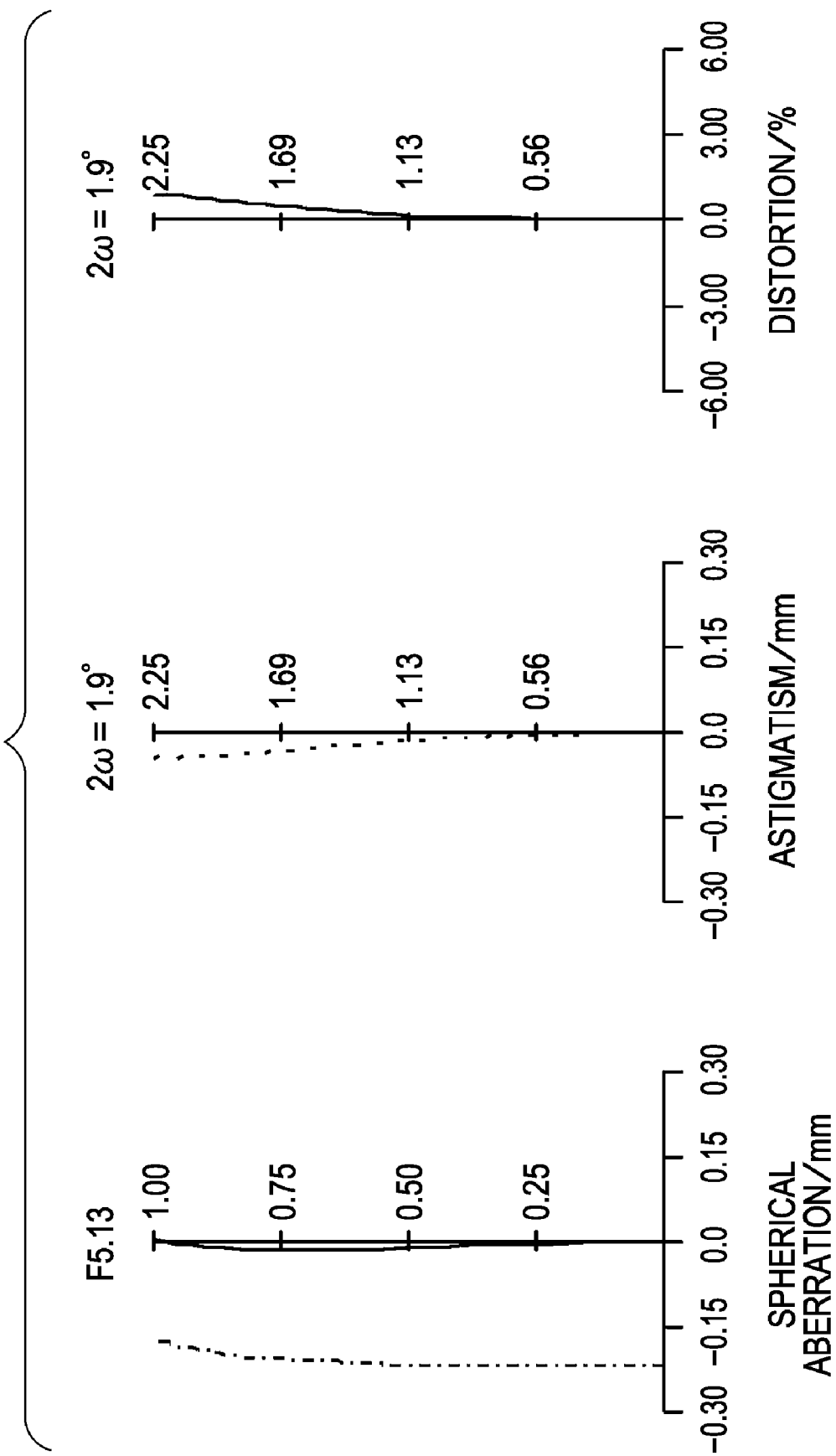
FIG. 12 illustrates aberration diagrams of the zoom lens system according to the third embodiment at a telephoto end.

FIG. 9 is a sectional view of a zoom lens system according to a third embodiment of the present invention at a wide-angle end. FIGS. 10, 11, and 12 illustrate aberration diagrams of the zoom lens system according to the third embodiment at the wide-angle end, an intermediate zooming position, and a telephoto end, respectively.

Figure 13:
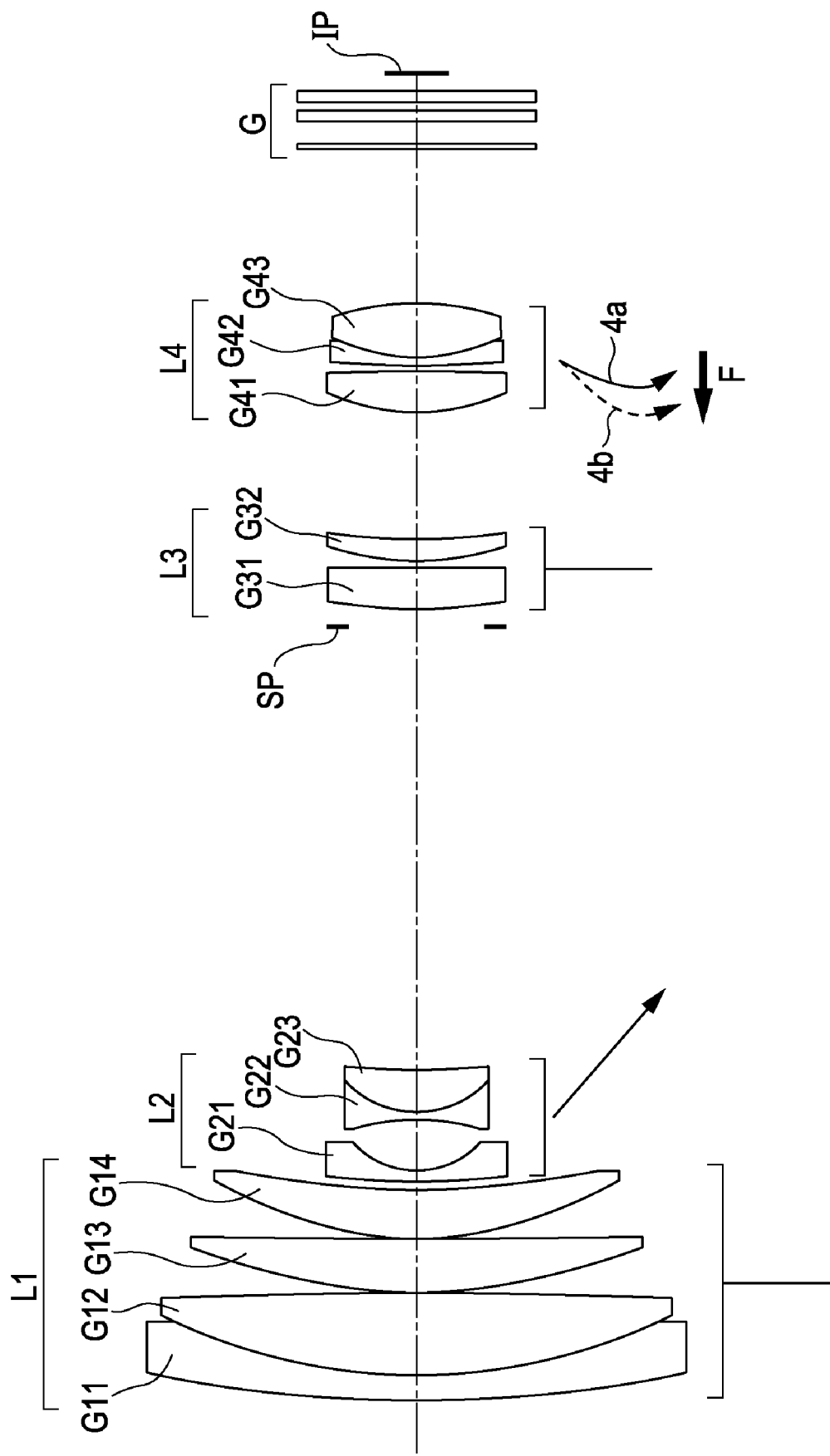
FIG. 13 is a sectional view of a zoom lens system according to a fourth embodiment at a wide-angle end.
Figure 14:
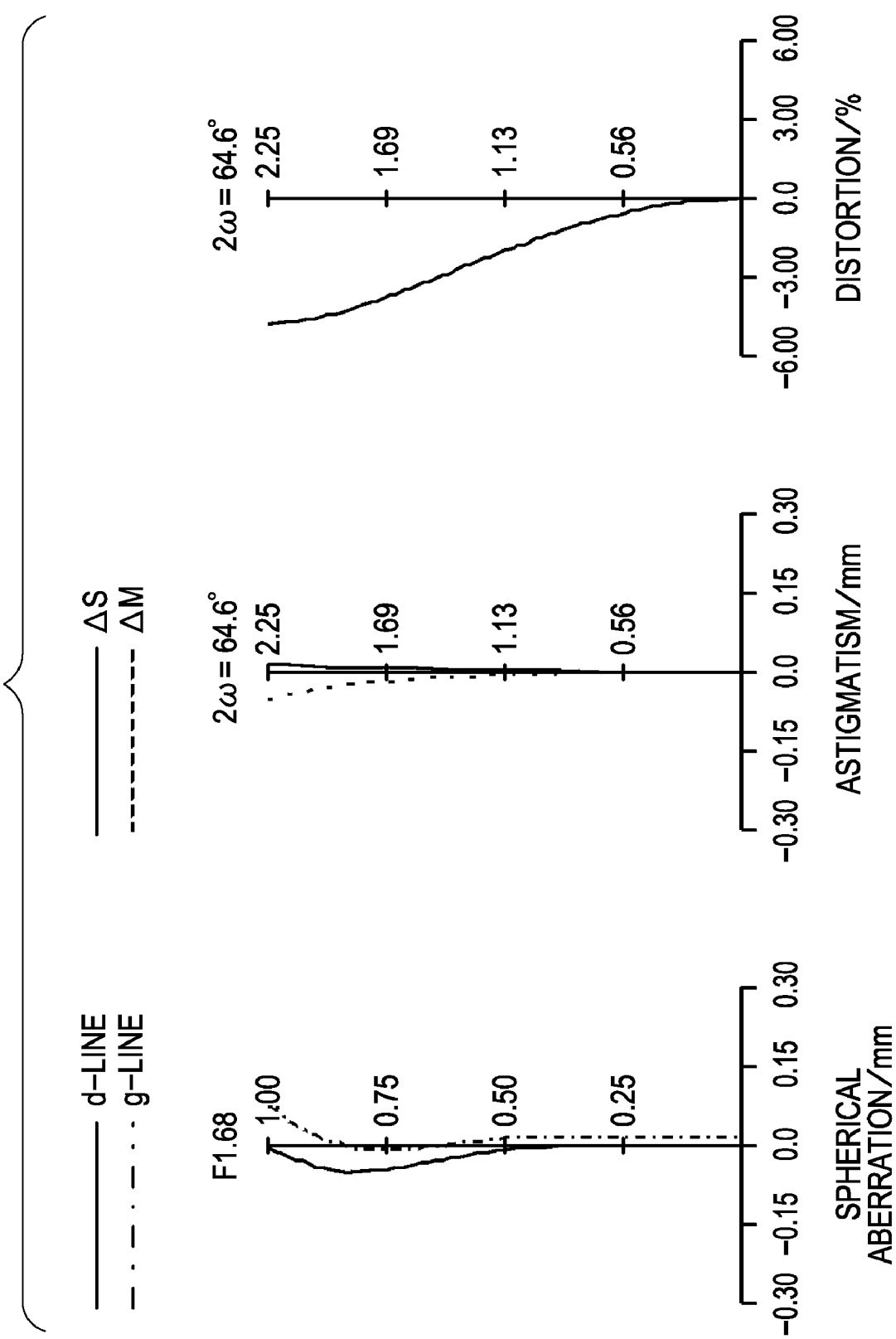
FIG. 14 illustrates aberration diagrams of the zoom lens system according to the fourth embodiment at the wide-angle end.
Figure 15:
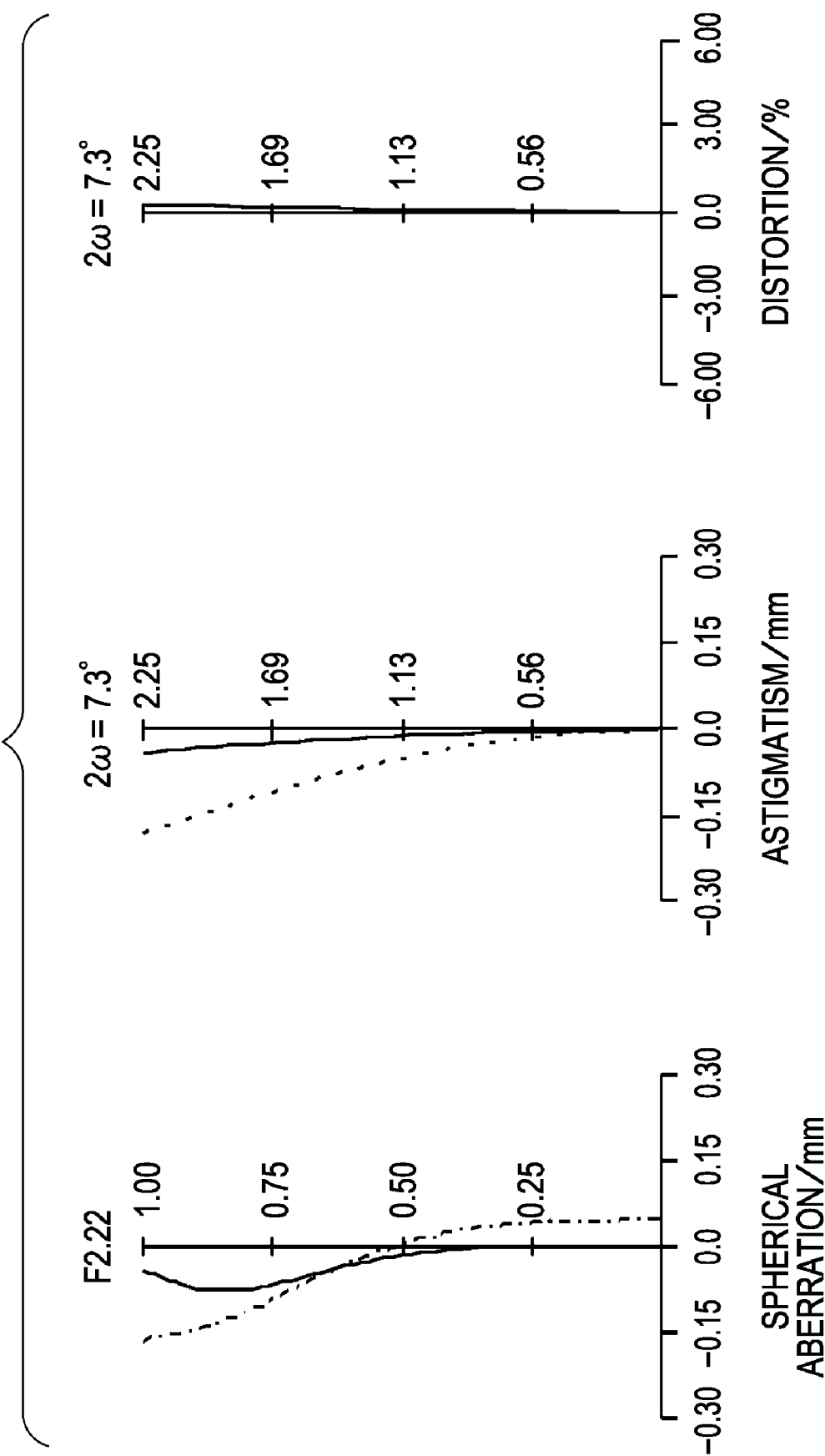
FIG. 15 illustrates aberration diagrams of the zoom lens system according to the fourth embodiment at an intermediate zooming position.
Figure 16:
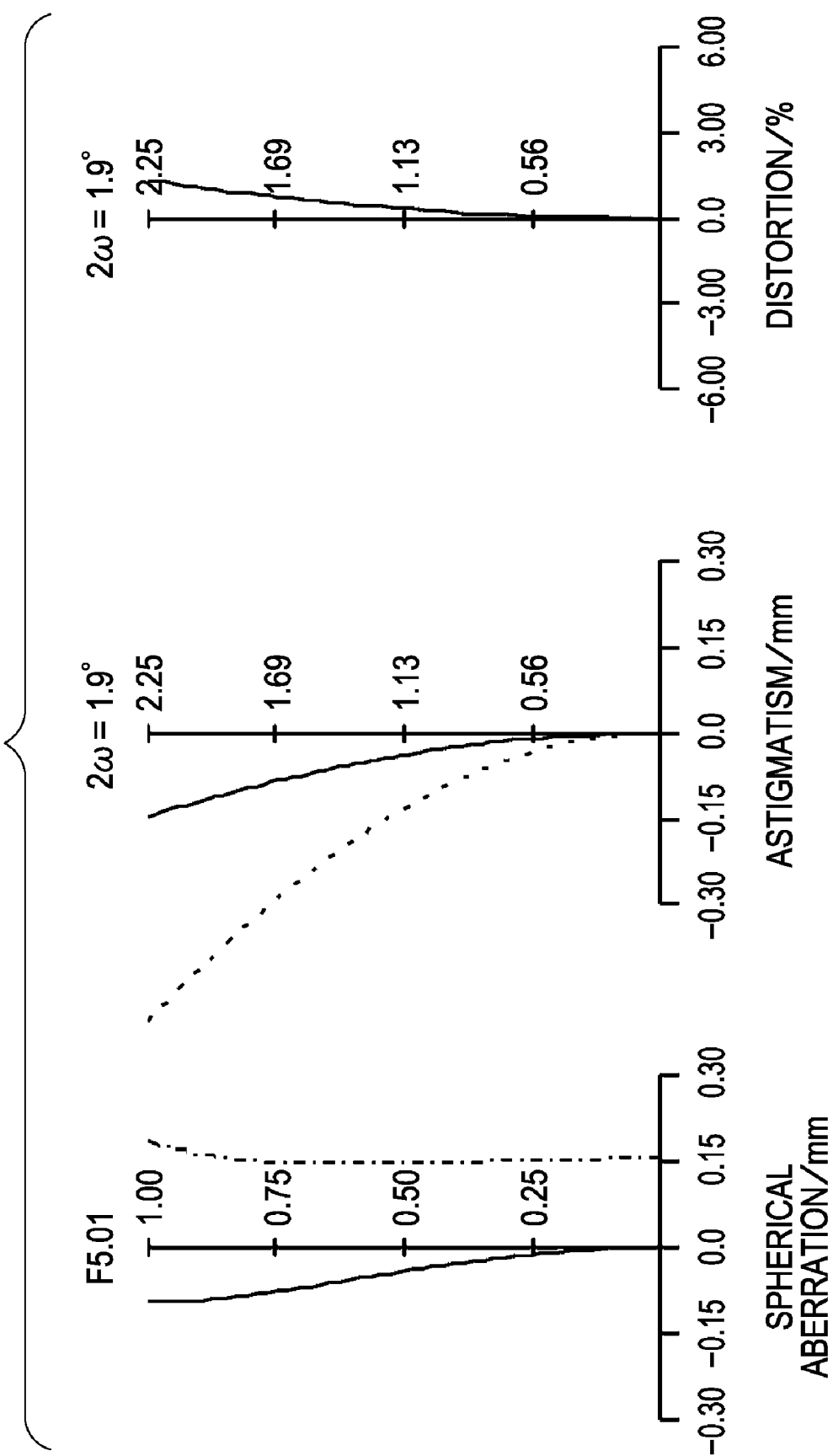
FIG. 16 illustrates aberration diagrams of the zoom lens system according to the fourth embodiment at a telephoto end.

FIG. 13 is a sectional view of a zoom lens system according to a fourth embodiment of the present invention at a wide-angle end. FIGS. 14, 15, and 16 illustrate aberration diagrams of the zoom lens system according to the fourth embodiment at the wide-angle end, an intermediate zooming position, and a telephoto end, respectively.

Figure 17:
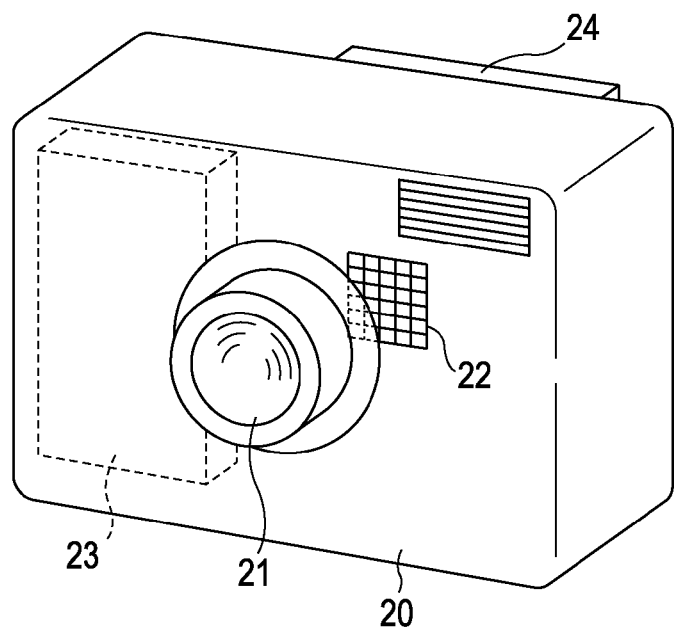
FIG. 17 is a schematic diagram illustrating the main part of a digital camera including a zoom lens system according to at least one embodiment of the present invention.

FIG. 17 is a schematic diagram illustrating the main part of a digital camera including a zoom lens according to an embodiment of the present invention.

Figure 18:
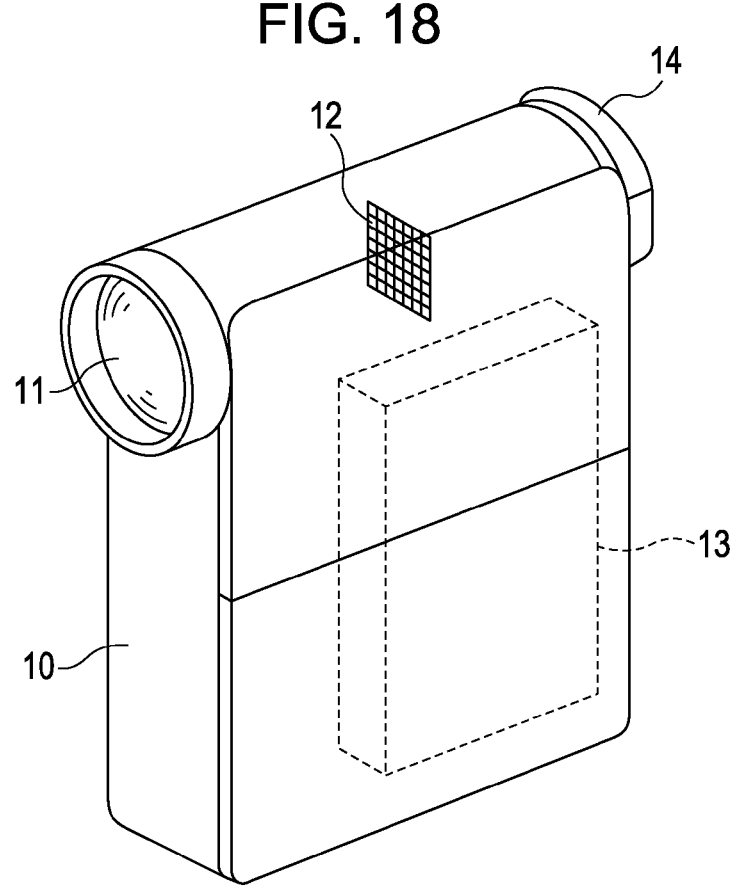
FIG. 18 is a schematic diagram illustrating the main part of a video camera including a zoom lens system according to at least one embodiment of the present invention.

FIG. 18 is a schematic diagram illustrating the main part of a video camera including a zoom lens according to an embodiment of the present invention.

The zoom lens system according to each embodiment is an imaging lens system used in a camera. In the sectional view of each zoom lens system, the left side shows the object side (front) and the right side shows the image side (rear).

Referring to the sectional views, each zoom lens system includes a first lens unit L1 having a positive refractive power, a second lens unit L2 having a negative refractive power, a third lens unit L3 having a positive refractive power, and a fourth lens unit L4 having a positive refractive power. SP denotes an aperture stop, which is positioned on the object side of the third lens unit L3.

G denotes an optical block corresponding to, for example, an optical filter, a faceplate, or the like.

IP denotes an image plane. In the case where the zoom lens system according to each embodiment is used as an imaging optical system of a video camera or a digital camera, an image pickup plane of a solid-state image pickup device (photoelectric conversion element), such as a CCD sensor and a CMOS sensor, corresponds to the image plane IP. In the case where the zoom lens system is used as an imaging optical system of a silver-halide film camera, a film surface corresponds to the image plane IP.

In the aberration diagrams, d and g denote the d-line and the g-line, respectively, and ΔM and ΔS denote a meridional image plane and a sagittal image plane, respectively. In addition, F denotes the F-number and ω denotes an imaging half field angle.

In each embodiment, the wide-angle end and the telephoto end are zooming positions corresponding to the states in which the magnification-varying lens unit (second lens unit) is at one and other ends of a mechanically moveable range along an optical axis.

In each embodiment, during zooming from the wide-angle end to the telephoto end, the magnification is varied by moving the second lens unit L2 toward the image side and image-plane variation caused as the magnification is varied is compensated for by moving the fourth lens unit L4 along a locus that is convex toward the image side.

In addition, the zoom lens system is a rear-focus zoom lens system in which focusing is performed by moving the fourth lens unit L4 along the optical axis. The solid curve 4a and the dashed curve 4b in each sectional view respectively show loci along which the fourth lens unit L4 is moved to compensate for the image-plane variation caused by the variation in magnification in the case where an object at infinity is in focus and in the case where an object at a close is in focus. Thus, the fourth lens unit L4 is moved along the locus that is convex toward the image side. Therefore, the air between the third lens unit L3 and the fourth lens unit L4 can be effectively used and the entire lens length can be effectively reduced.

The focusing operation from an object at infinity to an object at a close distance is performed by moving the fourth lens unit L4 forward, as shown by the arrow F.

The first lens unit L1 does not move along the optical axis for zooming or focusing. However, the first lens unit L1 may be moved to correct aberrations as necessary.

A lens unit having a refractive power may be disposed on the object side of the first lens unit L1 and/or on the image side of the fourth lens unit L4 as necessary.

In each embodiment, the following conditions are satisfied:

$$10.0 < f3/fw < 26.0 \quad (1)$$

$$1.2 < bft/fw < 3.5 \quad (2)$$

In the above expressions, fw is a focal length of the entire system at the wide-angle end, f3 is a focal length of the third lens unit, and bft is a back focus when an object at infinity is in focus at the telephoto end. The back focus bft is an equivalent air distance between the last lens surface and an image plane when an optical element, such as the glass block G, having no refractive power is removed.

Conditional expressions (1) and (2) are set for obtaining a small zoom lens with a high zoom ratio.

If the focal length of the third lens unit L3 is too large and the value of Conditional Expression (1) is greater than the upper limit thereof, load on the positive refractive power of the third lens unit L3 is reduced and the aberrations can be adequately corrected. However, it becomes necessary to increase (enhance) the power of the fourth lens unit L4 to prevent the entire lens length (distance between the first lens surface and the image plane) from being increased. As a result, it becomes difficult to suppress variations in aberrations over the entire zoom range.

In addition, if the focal length of the third lens unit L3 is increased, the effective lens diameter of the fourth lens unit L4 increases and the size of the entire system increases accordingly. In addition, load on an actuator which moves the fourth lens unit L4 for focusing increases.

If the focal length of the third lens unit L3 is too small and the value of Conditional Expression (1) is less than the lower limit thereof, load on the positive refractive power increases and it becomes difficult to obtain good optical performance.

In particular, large spherical aberration occurs at the wide-angle end. In addition, it becomes difficult to correct the aberrations over the entire zoom range in a balanced manner.

Conditional Expression (2) is provided for suitably setting the back focus.

In a high-zoom-ratio rear-focus zoom lens system, the fourth lens unit is positioned closest to the image side at the telephoto end. Therefore, it is necessary to set the back focus at the telephoto end to a required length.

If the back focus is too large and the value of Conditional Expression (2) is greater than the upper limit thereof, the distance between the first lens unit L1 and the image plane increases and the effective diameter of the first lens unit L1 increases accordingly. Therefore, it becomes difficult to reduce the size of the entire system.

In addition, divergence of light from the third lens unit L3 to the fourth lens unit L4 increases and the effective diameter of the fourth lens unit L4 increases accordingly. Therefore, load on the actuator increases in the operations of zooming, aberration correction, and focusing.

In addition, large variations in aberrations occur when the fourth lens unit L4 is moved. If the value of Conditional Expression (2) is less than the lower limit thereof, the back focus becomes too short and it becomes difficult to provide a space for placing the optical filter and the like.

The numerical ranges of Conditional Expressions (1) and (2) can also be set as follows:

$$10.5 < f3/fw < 23.0 \quad (1a)$$

$$1.5 < bft/fw < 2.5 \quad (2a)$$

In each embodiment, due to the above-described lens structure, a high zoom ratio (about 40) is obtained. In addition, a rear-focus zoom lens system in which the aberrations are adequately corrected over the entire zoom range, and which has a large aperture ratio such that the F-number is about 1.65 is obtained.

The zoom lens system according to each embodiment of the present invention is obtained by adopting the above-described structure. Further, to maintain satisfactory optical performance while obtaining a high zoom ratio, at least one of the following conditions can be satisfied.

That is, the third lens unit L3 can include a positive lens element G3$p$ having an aspherical surface. In addition, when f3$asp$ is a focal length of the positive lens element G3$p$, the following condition can be satisfied:

$$8.0 < f3asp/fw < 30.0 \quad (3)$$

In addition, the first lens unit L1 can include three or more positive lens elements. When vd1 is the average of Abbe numbers of materials of the positive lens elements included in the first lens unit L1, the following condition can be satisfied:

$$58 < vd1 \quad (4)$$

In addition, the second lens unit L2 can include a negative lens element G2$n$. When nd2 is a refractive index of the material of the negative lens element G2$n$, the following condition can be satisfied:

$$1.9 < nd2 \quad (5)$$

In addition, the fourth lens unit L4 can include a positive lens element G4$p$ having an aspherical surface. In addition, when f4$asp$ is a focal length of the positive lens element G4$p$, the following condition can be satisfied:

$$4.5 < f4asp/fw < 10 \quad (6)$$

In addition, when ft is a focal length of the entire system at the telephoto end and f2 is a focal length of the second lens unit L2, the following condition can be satisfied:

$$-0.40 < f2/(fw \times ft) < -0.15 \quad (7)$$

In addition, when OAL is a distance (so-called entire lens length) between one of the lens surfaces included in the zoom lens system that is closest to the object side (first surface) and the image plane and OALs is a distance between the aperture stop SP and the image plane, the following condition can be satisfied:

$$2.0 < OAL/OALs < 2.8 \quad (8)$$

The distance OALs is determined as a value (so-called equivalent air distance) obtained on the assumption that a glass block or the like that has no power is not placed between the last lens surface and the image plane.

Conditional Expression (8) is applied to the system in which the first lens unit L1 does not move during zooming as in each embodiment.

The technical meaning of each of the conditional expressions will now be described.

Conditional Expression (3) relates to the focal length of the positive lens element G3$p$ included in the third lens unit L3 and having an aspherical surface.

If the value of Conditional Expression (3) is greater than the upper limit thereof, the refractive power of the positive lens element G3$p$ is reduced and it becomes difficult to reduce the size of the third lens unit L3.

If the refractive power of the positive lens element G3$p$ is too high and the value of the Conditional Expression (3) is less than the lower limit thereof, the aberrations, in particular the spherical aberration, increase. In addition, the manufacturing sensitivity in the process of forming the aspherical surface increases. This largely affects the sensitivities of the aberrations.

As a result, the accuracy required in the process of forming the aspherical surface increases and it becomes difficult to form the aspherical surface. In addition, the accuracy required in the assembly process also increases.

The lens element having an aspherical surface is not limited to a glass lens. For example, a hybrid lens (so-called replica aspherical lens) obtained by placing a resin member having an aspherical surface (by adding an aspherical surface component) on a surface of a spherical lens made of glass may also be used. Alternatively, an aspherical lens made of plastic may also be used.

The numerical range of Conditional Expression (3) can also be set as follows:

$$10.0 < f3asp/fw < 25 \quad (3a)$$

Conditional Expression (4) relates to the average Abbe number of the materials of the positive lens elements included in the first lens unit L1.

Conditional Expression (4) is provided for adequately correcting the axial chromatic aberration over the entire zoom range. If the value of Conditional Expression (4) is less than the lower limit thereof, the axial chromatic aberration cannot be sufficiently corrected over the entire zoom range.

The numerical range of Conditional Expression (4) can also be set as follows:

$$60 < vd1 \quad (4a)$$

Conditional Expression (5) relates to the refractive index of the material of the negative lens element G2$n$ included in the second lens unit L2.

If the refractive index of the material of the negative lens element G2n is less than the lower limit of Conditional Expression (5), the Petzval sum increases in the negative direction and the image plane is over-corrected.

The numerical range of Conditional Expression (5) can also be set as follows:

$$1.95<nd2 \tag{5a}$$

Conditional Expression (6) relates to the focal length of the positive lens element G4p included in the fourth lens unit L4 having an aspherical surface.

If the focal length of the positive lens element G4p is too large (power is too low) and the value of Conditional Expression (6) is greater than the upper limit thereof, the amount of movement during zooming and focusing increases and the size of the entire system increases accordingly.

If the focal length of the positive lens element G4p is too small (power is too high) and the value of Conditional Expression (6) is less than the lower limit thereof, variations in the spherical aberration and coma aberration during zooming and focusing increase.

The lens element having an aspherical surface is not limited to a glass lens, and a hybrid lens or a plastic lens may also be used, as described above.

The numerical range of Conditional Expression (6) can also be set as follows:

$$5.5<f4asp/fw<8.5 \tag{6a}$$

Conditional Expression (7) relates to the focal length, in other words, the refractive power of the second lens unit L2. If the focal length of the second lens unit L2 is too large (power is too low) and the value of Conditional Expression (7) is greater than the upper limit thereof, the amount of movement of the second lens unit L2 for obtaining a desired zoom ratio increases and the entire lens length and the diameter of the front lens increase.

In addition, if focal length of the second lens unit L2 is too small (power is too high) and the value of Conditional Expression (7) is smaller than the lower limit thereof, although the size of the entire lens system can be reduced, the Petzval sum increases in the negative direction and the image plane is over-corrected.

The numerical range of Conditional Expression (7) can also be set as follows:

$$-0.35<f2/\sqrt{(fw \times ft)}<-0.20 \tag{7a}$$

Conditional Expression (8) relates to the ratio of the distance between the first lens surface of the lens system and the image plane to the distance between the aperture stop and the image plane.

If the value of Conditional Expression (8) is greater than the upper limit thereof, the distance between the aperture stop SP and the image plane is too small. Therefore, in the focusing operation performed by the fourth lens unit L4, the focusing range from an object at infinity to an object at a close position is limited.

In addition, the distance between the aperture stop SP and the first lens unit L1 increases and the effective diameter of a first lens G11 included in the first lens unit L1 increases. As a result, it becomes difficult to reduce the size of the entire system.

If the value of Conditional Expression (8) is less than the lower limit thereof, the distance between the aperture stop SP and the image plane increases, and the effective diameter and weight of the fourth lens unit L4 increase. In such a case, it becomes difficult to perform quick focusing when the focusing operation is performed by moving the fourth lens unit L4 in the rear-focus zoom lens system.

The numerical range of Conditional Expression (8) can also be set as follows:

$$2.1<OAL/OALs<2.7 \tag{8a}$$

The third lens unit L3 can include only the positive lens element G3p having an aspherical surface.

When the third lens unit L3 having a positive refractive power is formed to have an aspherical surface, the spherical aberration can be adequately corrected at the wide-angle end. In addition, the number of lenses can be reduced.

Therefore, the third lens unit L3 can include only the positive lens element G3p, so that the size of the third lens unit L3 can be reduced.

In addition, to adequately correct the aberrations, the aspherical surface can be formed not only on one side but also on the other side of the positive lens element G3p.

The third lens unit L3 can also include two positive lens elements, which are the positive lens element G3p having an aspherical surface and another positive lens element. When the third lens unit L3 includes two positive lens elements, the aberrations can be easily corrected.

The detailed structure of the lens system of each embodiment will now be described. Unless particularly specified otherwise, elements included in the lens system are explained in order from the object side to the image side.

The zoom lens system according to each of the first to fourth embodiments has the following structure.

The first lens unit includes a cemented lens including a negative meniscus lens element G11 that is convex on the object side and a positive lens element; a positive meniscus lens element G13 that is convex on the object side; and a positive meniscus lens element G14 that is convex on the object side.

Accordingly, the chromatic aberration and the spherical aberration are adequately corrected. To more adequately correct the chromatic aberration, the positive lens element G12, the positive lens element G13, and the positive lens element G14 included in the first lens unit can be made of ultra-low dispersion glass such as S-FPL51 and S-FPL53 (trade names) produced by OHARA Inc.

The second lens unit includes a cemented lens including a negative meniscus lens element G21 that is convex on the object side, a biconcave negative lens element G22, and a positive lens element G23 that is convex on the object side. Due to this structure, variations in aberrations that occur during zooming can be adequately corrected.

In the first to third embodiments, the third lens unit L3 is formed of a single positive lens element G31. In the fourth embodiment shown in FIG. 13, the third lens unit L3 includes a positive lens element G31 and a positive lens element G32. In each embodiment, the positive lens element G31 has an aspherical surface at either side thereof, and the power of the lens itself is not increased so that the aberrations can be effectively corrected without increasing the sensitivity.

The aspherical surface is formed such that the positive refractive power decreases from the center of the lens toward the periphery thereof. In other words, the power of the positive lens element G31 is adequately set so that an aspherical surface can be formed on either side of the positive lens element G31 and the aberrations can be adequately corrected. In addition, the third lens unit L3 outputs the divergent light from the second lens unit L2 without increasing the diameter thereof (so that the diameter of the fourth lens unit L4 can be prevented from being increased).

In each embodiment, the aperture stop SP is positioned on the object side of the third lens unit L3. However, the aperture stop SP can also be moved individually during zooming or be placed in the third lens unit L3 or on the image side of the third lens unit L3.

The fourth lens unit includes a cemented lens including a biconvex positive lens element G41, a negative meniscus lens element G42 having a convex surface on the object side, and a biconvex positive lens element G43. The positive lens element G41 has an aspherical surface on either side thereof. Accordingly, variations in aberrations during the focusing operation using the fourth lens unit L4 can be reduced.

As described above, according to each embodiment, the size of the entire lens system can be reduced and a zoom lens system having a high zoom ratio and high optical performance can be obtained.

In addition, a rear-focus zoom lens system which has a high zoom ratio (about 40) and which has high optical performance over the entire zoom range from the wide-angle end to the telephoto end can be obtained.

The first lens unit L1 does not move for zooming. Therefore, the mechanical structure can be simplified.

Further, a zoom lens system which has a high zoom ratio (about 40), which provides high optical performance over the entire zoom range, and which has a has a large aperture ratio such that the F-number is about 1.65 at the wide-angle end, can be obtained.

Numerical examples corresponding to the above-described embodiments will now be described. In each numerical example, i denotes the number of each surface counted from the object side. In addition, Ri indicates the radius of curvature of the $i^{th}$ surface and di indicates the distance between the $i^{th}$ surface and the $(i+1)^{th}$ surface. Ni is the refractive index with reference to the d line and vi indicates the Abbe number (vd) of the material with respect to the d line. The Abbe number (vd) can be expressed as follows:

$$vd = (Nd-1)/(NF-NC)$$

In the above equation, Nd is a refractive index with respect to the d-line (wavelength 587.6 nm), NF is a refractive index with respect to the F-line (wavelength 486.1 nm), and NC is a refractive index with respect to the C-line (wavelength 656.3 nm).

In each of the numerical examples, some surfaces closest to the image side are surfaces forming the optical block G or the like. In addition, k, B, C, D, and E are the aspherical coefficients.

When x is the position of the aspherical surface in the optical axis direction with respect to the vertex of the aspherical surface at a height h from the optical axis, the shape of the aspherical surface is expressed as follows:

$$x = (h^2/R)/[1+1(1+k)(h/R)^2\}^{1/2}] + Bh^4 + Ch^6 + Dh^8 + Eh^{10}$$

In the above equation, R is a paraxial radius of curvature. In addition, "E-Z", for example, means "$10^{-z}$."

Table 1 provided below shows the relationship between the above-described conditional expressions and the numerical examples.

| First Numerical Example | | | | |
|---|---|---|---|---|
| i | Ri | di | Ni | vi |
| 1 | 99.207 | 1.70 | 1.80518 | 25.4 |
| 2 | 41.142 | 5.45 | 1.48749 | 70.2 |
| 3 | −325.945 | 0.17 | | |
| 4 | 43.541 | 3.40 | 1.48749 | 70.2 |
| 5 | 298.330 | 0.17 | | |
| 6 | 26.891 | 3.25 | 1.60311 | 60.6 |
| 7 | 65.488 | (Variable) | | |
| 8 | 50.090 | 0.70 | 2.00060 | 25.5 |
| 9 | 5.971 | 3.51 | | |
| 10 | −17.285 | 0.60 | 1.58313 | 59.4 |
| 11 | 7.690 | 2.80 | 1.92286 | 18.9 |
| 12 | 43.001 | (Variable) | | |
| 13 | (Aperture) | 1.30 | | |
| 14* | 22.573 | 2.70 | 1.58313 | 59.4 |
| 15* | 215.489 | (Variable) | | |
| 16* | 15.337 | 2.70 | 1.58313 | 59.4 |
| 17* | −53.052 | 0.33 | | |
| 18 | 123.556 | 0.60 | 1.84666 | 23.8 |
| 19 | 11.628 | 3.60 | 1.51742 | 52.4 |
| 20 | −15.274 | (Variable) | | |
| 21 | ∞ | 0.30 | 1.51400 | 70.0 |
| 22 | ∞ | 1.51 | | |
| 23 | ∞ | 0.80 | 1.54400 | 60.0 |
| 24 | ∞ | 0.60 | | |
| 25 | ∞ | 0.75 | 1.49000 | 70.0 |
| 26 | ∞ | | | |

| Aspherical Coefficients | | | | | |
|---|---|---|---|---|---|
| | K | B | C | D | E |
| 14* | 7.355E−02 | −8.726E−05 | 0.000E+00 | 0.000E+00 | 0.000E+00 |
| 15* | 7.226E+02 | −6.549E−05 | 4.120E−07 | 0.000E+00 | 0.000E+00 |
| 16* | −1.294E+00 | −4.795E−05 | 1.775E−07 | 2.179E−09 | −3.479E−11 |
| 17* | −3.432E+01 | 3.512E−06 | 0.000E+00 | 0.000E+00 | 0.000E+00 |

-continued

First Numerical Example

Data Zoom Ratio 39.48

|  | Wide Angle | Intermediate | Telephoto |
| --- | --- | --- | --- |
| Focal Length | 3.41 | 34.67 | 134.48 |
| F-number | 1.65 | 2.24 | 5.13 |
| Half Field Angle | 33.45 | 3.71 | 0.96 |
| Image Height | 2.25 | 2.25 | 2.25 |
| Entire Lens Length | 87.5 | 87.5 | 87.5 |
| BF | 14.45 | 20.31 | 5.87 |

Distance

|  | | | |
| --- | --- | --- | --- |
| d7 | 0.52 | 23.56 | 29.32 |
| d12 | 30.50 | 7.46 | 1.70 |
| d15 | 9.06 | 3.30 | 17.61 |
| d20 | 9.94 | 15.70 | 1.38 |

Second Numerical Example

| i | Ri | di | Ni | νi |
| --- | --- | --- | --- | --- |
| 1 | 50.493 | 1.65 | 1.84666 | 23.4 |
| 2 | 30.309 | 5.42 | 1.51633 | 64.1 |
| 3 | 294.807 | 0.20 | | |
| 4 | 31.866 | 3.50 | 1.48749 | 70.2 |
| 5 | 126.658 | 0.20 | | |
| 6 | 37.603 | 2.73 | 1.696797 | 55.5 |
| 7 | 62.948 | (Variable) | | |
| 8 | 76.728 | 0.70 | 2.0033 | 28.3 |
| 9 | 6.529 | 3.47 | | |
| 10 | −22.254 | 0.60 | 1.669979 | 39.3 |
| 11 | 7.455 | 2.13 | 1.92286 | 18.9 |
| 12 | 68.866 | (Variable) | | |
| 13 | (Aperture) | 1.11 | | |
| 14* | 23.853 | 1.97 | 1.583126 | 59.4 |
| 15* | −500.000 | (Variable) | | |
| 16* | 20.088 | 2.90 | 1.583126 | 59.4 |
| 17* | −49.325 | 0.35 | | |
| 18 | 475.741 | 0.65 | 1.92286 | 18.9 |
| 19 | 21.567 | 3.34 | 1.603112 | 60.6 |
| 20 | −17.600 | (Variable) | | |
| 21 | ∞ | 0.30 | 1.514 | 70.0 |
| 22 | ∞ | 1.51 | | |
| 23 | ∞ | 1.78 | 1.544 | 60.0 |
| 24 | ∞ | 0.60 | | |
| 25 | ∞ | 0.75 | 1.49 | 70.0 |
| 26 | ∞ | | | |

Aspherical Coefficients

|  | K | B | C | D | E |
| --- | --- | --- | --- | --- | --- |
| 14* | 1.886E+00 | −9.412E−05 | −1.924E−06 | 0.000E+00 | 0.000E+00 |
| 15* | 0.000E+00 | −4.069E−05 | −1.588E−06 | −1.767E−09 | 0.000E+00 |
| 16* | −1.127E+00 | −1.920E−06 | −1.776E−07 | −5.067E−09 | 5.419E−11 |
| 17* | 0.000E+00 | 9.379E−05 | −4.655E−07 | 0.000E+00 | 0.000E+00 |

Data Zoom Ratio 38.90

|  | Wide Angle | Intermediate | Telephoto |
| --- | --- | --- | --- |
| Focal Length | 3.50 | 31.50 | 136.15 |
| F-number | 1.67 | 1.86 | 5.38 |
| Half Field Angle | 32.74 | 4.09 | 0.95 |
| Image Height | 2.25 | 2.25 | 2.25 |
| Entire Lens Length | 87.2 | 87.2 | 87.2 |
| BF | 13.73 | 18.42 | 5.70 |

-continued

Second Numerical Example

Distance

| | | | |
|---|---|---|---|
| d7 | 0.60 | 24.30 | 30.52 |
| d12 | 32.37 | 8.67 | 2.44 |
| d15 | 9.62 | 4.99 | 18.52 |
| d20 | 8.42 | 13.05 | 0.50 |

Third Numerical Example

| i | Ri | di | Ni | vi |
|---|---|---|---|---|
| 1 | 91.145 | 1.70 | 1.84666 | 23.4 |
| 2 | 37.812 | 5.20 | 1.51633 | 64.1 |
| 3 | −1579.582 | 0.20 | | |
| 4 | 39.279 | 3.76 | 1.51633 | 64.1 |
| 5 | 488.340 | 0.20 | | |
| 6 | 26.082 | 2.87 | 1.69680 | 55.5 |
| 7 | 55.834 | (Variable) | | |
| 8 | 47.213 | 0.70 | 2.00060 | 25.5 |
| 9 | 6.200 | 3.49 | | |
| 10 | −20.205 | 0.60 | 1.69350 | 53.2 |
| 11 | 7.195 | 2.96 | 1.92286 | 18.9 |
| 12 | 63.590 | (Variable) | | |
| 13 | (Aperture) | 0.61 | | |
| 14* | 44.069 | 2.70 | 1.58313 | 59.4 |
| 15* | 2684.252 | (Variable) | | |
| 16* | 15.178 | 2.70 | 1.58313 | 59.4 |
| 17* | −57.162 | 0.35 | | |
| 18 | 151.323 | 0.60 | 1.84666 | 23.8 |
| 19 | 13.724 | 3.31 | 1.60311 | 60.6 |
| 20 | −17.477 | (Variable) | | |
| 21 | ∞ | 0.30 | 1.51400 | 70.0 |
| 22 | ∞ | 1.51 | | |
| 23 | ∞ | 0.80 | 1.54400 | 60.0 |
| 24 | ∞ | 0.60 | | |
| 25 | ∞ | 0.70 | 1.49000 | 70.0 |
| 26 | ∞ | | | |

Aspherical Coefficients

| | K | B | C | D | E |
|---|---|---|---|---|---|
| 14* | −3.259E+00 | −2.098E−04 | 0.000E+00 | 0.000E+00 | 0.000E+00 |
| 15* | 2.630E+05 | −1.921E−04 | 8.548E−07 | 0.000E+00 | 0.000E+00 |
| 16* | −2.213E+00 | −1.787E−05 | 2.311E−07 | −7.668E−09 | 7.300E−11 |
| 17* | 3.454E+01 | 6.617E−05 | 0.000E+00 | 0.000E+00 | 0.000E+00 |

Data Zoom Ratio 39.49

| | Wide Angle | Intermediate | Telephoto |
|---|---|---|---|
| Focal Length | 3.37 | 30.37 | 133.14 |
| F-number | 1.65 | 2.00 | 5.13 |
| Half Field Angle | 33.72 | 4.24 | 0.97 |
| Image Height | 2.25 | 2.25 | 2.25 |
| Entire Lens Length | 86.9 | 86.9 | 86.9 |
| BF | 15.43 | 19.33 | 5.95 |

Distance

| | | | |
|---|---|---|---|
| d7 | 0.53 | 20.83 | 25.90 |
| d12 | 26.78 | 6.48 | 1.40 |
| d15 | 12.18 | 8.28 | 21.62 |
| d20 | 10.95 | 14.84 | 1.50 |

Fourth Numerical Example

| i | Ri | di | Ni | vi |
|---|---|---|---|---|
| 1 | 101.610 | 1.70 | 1.80518 | 25.4 |
| 2 | 41.262 | 5.45 | 1.48749 | 70.2 |

-continued

Fourth Numerical Example

| | | | | |
|---|---|---|---|---|
| 3 | −325.945 | 0.17 | | |
| 4 | 43.324 | 3.40 | 1.48749 | 70.2 |
| 5 | 759.715 | 0.17 | | |
| 6 | 27.052 | 3.25 | 1.60311 | 60.6 |
| 7 | 64.453 | (Variable) | | |
| 8 | 54.592 | 0.70 | 2.00060 | 25.5 |
| 9 | 5.983 | 3.51 | | |
| 10 | −18.302 | 0.60 | 1.58313 | 59.4 |
| 11 | 7.635 | 2.80 | 1.92286 | 18.9 |
| 12 | 40.197 | (Variable) | | |
| 13 | (Aperture) | 1.30 | | |
| 14* | 37.580 | 2.69 | 1.58313 | 59.4 |
| 15* | 215.489 | 0.50 | | |
| 16 | 22.721 | 1.47 | 1.48749 | 70.2 |
| 17 | 47.528 | (Variable) | | |
| 18* | 14.960 | 2.79 | 1.58313 | 59.4 |
| 19* | −52.509 | 0.33 | | |
| 20 | 263.451 | 0.60 | 1.84666 | 23.8 |
| 21 | 13.117 | 3.60 | 1.51742 | 52.4 |
| 22 | −16.817 | (Variable) | | |
| 23 | ∞ | 0.30 | 1.51400 | 70.0 |
| 24 | ∞ | 1.51 | | |
| 25 | ∞ | 0.80 | 1.54400 | 60.0 |
| 26 | ∞ | 0.60 | | |
| 27 | ∞ | 0.75 | 1.49000 | 70.0 |
| 28 | ∞ | | | |

Aspherical Coefficients

| | K | B | C | D | E |
|---|---|---|---|---|---|
| 14* | 7.355E−02 | −5.614E−05 | 0.000E+00 | 0.000E+00 | 0.000E+00 |
| 15* | 7.226E+02 | −5.758E−05 | 1.438E−07 | 8.105E−09 | −8.501E−11 |
| 18* | −7.443E−01 | −1.160E−04 | −1.361E−07 | −3.897E−09 | −3.075E−10 |
| 19* | 5.277E+01 | 2.264E−05 | 0.000E+00 | 0.000E+00 | 0.000E+00 |

Data Zoom Ratio 38.17

| | Wide Angle | Intermediate | Telephoto |
|---|---|---|---|
| Focal Length | 3.56 | 35.16 | 135.90 |
| F-number | 1.68 | 2.22 | 5.01 |
| Half Field Angle | 32.30 | 3.66 | 0.95 |
| Image Height | 2.25 | 2.25 | 2.25 |
| Entire Lens Length | 88.2 | 88.2 | 88.2 |
| BF | 14.69 | 20.47 | 5.77 |

Distance

| | | | |
|---|---|---|---|
| d7 | 0.51 | 22.86 | 28.44 |
| d12 | 29.52 | 7.16 | 1.60 |
| d17 | 8.43 | 2.62 | 17.48 |
| d22 | 10.21 | 16.03 | 1.16 |

TABLE 1

| | | 1st Example | 2nd Example | 3rd Example | 4th Example |
|---|---|---|---|---|---|
| Conditional Expression (1) | f3/fw | 12.6 | 11.2 | 22.8 | 11.7 |
| Conditional Expression (2) | bft/fw | 1.72 | 1.63 | 1.77 | 1.62 |
| Conditional Expression (3) | f3asp/fw | 12.6 | 11.2 | 22.8 | 21.8 |
| Conditional Expression (4) | vd1 | 67.0 | 63.3 | 61.2 | 67.0 |
| Conditional Expression (5) | nd2 | 2.00069 | 2.00330 | 2.00069 | 2.00069 |
| Conditional Expression (6) | f4asp/fw | 6.1 | 7.1 | 6.2 | 5.7 |
| Conditional Expression (7) | f2/√(fw × ft) | −0.28 | −0.30 | −0.28 | −0.27 |
| Conditional Expression (8) | 0AL/0ALs | 2.5 | 2.6 | 2.3 | 2.4 |

Next, a digital still camera including a zoom lens according to at least one embodiment of the present invention as an imaging optical system will be described with reference to FIG. 17.

Referring to FIG. 17, a camera body 20 includes an imaging optical system 21 including the zoom lens system according to at least one of the first to fourth embodiments.

A solid-state image pickup device (photoelectric conversion element) 22, such as a CCD sensor and a CMOS sensor, for receiving an object image formed by the imaging optical system 21 is disposed in the camera body 20. A memory 23 records information corresponding to the object image that is subjected to photoelectric conversion performed by the solid-state image pickup device 22.

A finder 24 is formed of, for example, a liquid crystal display panel or the like and allows a user to observe the object image formed on the image-pickup element 22.

Next, a video camera (optical apparatus) including a zoom lens system according to at least one embodiment of the present invention as an imaging optical system will be described with reference to FIG. 18.

Referring to FIG. 18, a video camera body 10 includes an imaging optical system 11 including the zoom lens system according to at least one of the first to fourth embodiments.

A solid-state image pickup device (photoelectric conversion element) 12, such as a CCD sensor and a CMOS sensor, for receiving an object image formed by the imaging optical system 11 is disposed in the camera body 20. A memory 13 records information corresponding to the object image that is subjected to photoelectric conversion performed by the solid-state image pickup device 12.

A finder 14 is used for observing an object image displayed on a display device (not shown).

The display device includes a liquid crystal panel or the like and displays the object image formed on the image pickup device 12.

When the zoom lens system according to at least one embodiment of the present invention is included in a camera such as a digital still camera and a video camera, a small camera which provides high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2008-030298 filed Feb. 12, 2008, which is hereby incorporated by reference herein in its entirety.

What is claimed is:

1. A zoom lens system comprising:
a first lens unit having a positive optical power;
a second lens unit having a negative optical power, wherein the second lens unit moves during zooming;
a third lens unit having a positive optical power, wherein the third lens unit does not move for zooming; and
a fourth lens unit having a positive optical power, wherein the fourth lens unit moves during zooming,
wherein the first lens unit, the second lens unit, the third lens unit, and the fourth lens unit are arranged in order from an object side to an image side, and
wherein the following conditions are satisfied:

$$10.0 < f3/fw < 26.0$$

$$1.2 < bft/fw < 3.5$$

where fw is a focal length of the zoom lens system at a wide-angle end, f3 is a focal length of the third lens unit, and bft is an equivalent air distance of a back focus at a telephoto end,
wherein the first lens unit includes three or more positive lens elements, and wherein the following condition is satisfied:

$$58 < vd1$$

where vd1 is an average of Abbe numbers of materials of the positive lens elements included in the first lens unit.

2. The zoom lens system according to claim 1, wherein the third lens unit includes a positive lens element having an aspherical surface, and wherein the following condition is satisfied:

$$8.0 < f3asp/fw < 30.0$$

where f3asp is a focal length of the positive lens element.

3. The zoom lens system according to claim 1, wherein the second lens unit includes a negative lens element that satisfies the following condition:

$$1.9 < nd2$$

where nd2 is a refractive index of the material of the negative lens element.

4. The zoom lens system according to claim 1, wherein the fourth lens unit includes a positive lens element having an aspherical surface, and wherein the following condition is satisfied:

$$4.5 < f4asp/fw < 10$$

where f4asp is a focal length of the positive lens element.

5. The zoom lens system according to claim 1, wherein the following condition is satisfied:

$$0.40 < f2/\sqrt{(fw \times ft)} < -0.15$$

where ft is a focal length of the zoom lens system at the telephoto end and f2 is a focal length of the second lens unit.

6. The zoom lens system according to claim 1, further comprising:
an aperture stop which does not move for zooming,
wherein the first lens unit does not move for zooming, and
wherein the following condition is satisfied:

$$2.0 < OAL/OALs < 2.8$$

where OAL is a distance between one of lens surfaces included in the zoom lens system that is closest to the object side and an image plane and OALs is a distance between the aperture stop and the image plane.

7. The zoom lens system according to claim 1, wherein the first lens unit consists of a cemented lens including a negative meniscus lens element that is convex on the object side and a positive lens element, a positive meniscus lens element that is convex on the object side, a positive meniscus lens element that is convex on the object side, which are arranged in order from the object side to the image side,
wherein the second lens unit consists of a negative meniscus lens element that is convex on the object side, and a cemented lens including a biconcave negative lens element and a positive lens element that is convex on the object side, which are arranged in order from the object side to the image side, and
wherein the fourth lens unit consists of a biconvex positive lens element, and a cemented lens including a negative meniscus lens element that is convex on the object side and a biconvex positive lens element, which are arranged in order from the object side to the image side.

8. A camera comprising:
the zoom lens system according to claim 1; and
a solid-state image pickup device which receives an image formed by the zoom lens system.

9. A zoom lens system comprising:
a first lens unit having a positive optical power;
a second lens unit having a negative optical power, wherein the second lens unit moves during zooming;
a third lens unit having a positive optical power, wherein the third lens unit does not move for zooming; and
a fourth lens unit having a positive optical power, wherein the fourth lens unit moves during zooming,
wherein the first lens unit, the second lens unit, the third lens unit, and the fourth lens unit are arranged in order from an object side to an image side,
wherein the following conditions are satisfied:

$$10.0 < f3/fw < 26.0$$

$$1.2 < bft/fw < 3.5$$

where fw is a focal length of the zoom lens system at a wide-angle end, f3 is a focal length of the third lens unit, and bft is an equivalent air distance of a back focus at a telephoto end, and
wherein the second lens unit includes a negative lens element that satisfies the following condition:

$$1.9 < nd2$$

where nd2 is a refractive index of the material of the negative lens element.

10. A zoom lens system comprising:
a first lens unit having a positive optical power;
a second lens unit having a negative optical power, wherein the second lens unit moves during zooming;
a third lens unit having a positive optical power, wherein the third lens unit does not move for zooming; and
a fourth lens unit having a positive optical power, wherein the fourth lens unit moves during zooming,
wherein the first lens unit, the second lens unit, the third lens unit, and the fourth lens unit are arranged in order from an object side to an image side,
wherein the following conditions are satisfied:

$$10.0 < f3/fw < 26.0$$

$$1.2 < bft/fw < 3.5$$

where fw is a focal length of the zoom lens system at a wide-angle end, f3 is a focal length of the third lens unit, and bft is an equivalent air distance of a back focus at a telephoto end,
wherein the fourth lens unit includes a positive lens element having an aspherical surface, and
wherein the following condition is satisfied:

$$4.5 < f4asp/fw < 10$$

where f4asp is a focal length of the positive lens element.

11. A zoom lens system comprising:
a first lens unit having a positive optical power;
a second lens unit having a negative optical power, wherein the second lens unit moves during zooming;
a third lens unit having a positive optical power, wherein the third lens unit does not move for zooming; and
a fourth lens unit having a positive optical power, wherein the fourth lens unit moves during zooming,
wherein the first lens unit, the second lens unit, the third lens unit, and the fourth lens unit are arranged in order from an object side to an image side,
wherein the following conditions are satisfied:

$$10.0 < f3/fw < 26.0$$

$$1.2 < bft/fw < 3.5$$

where fw is a focal length of the zoom lens system at a wide-angle end, f3 is a focal length of the third lens unit, and bft is an equivalent air distance of a back focus at a telephoto end, and
wherein the following condition is satisfied:

$$0.40 < f2/\sqrt{(fw \times ft)} < -0.15$$

where ft is a focal length of the zoom lens system at the telephoto end and f2 is a focal length of the second lens unit.

12. A zoom lens system comprising:
a first lens unit having a positive optical power;
a second lens unit having a negative optical power, wherein the second lens unit moves during zooming;
a third lens unit having a positive optical power, wherein the third lens unit does not move for zooming;
a fourth lens unit having a positive optical power, wherein the fourth lens unit moves during zooming,
wherein the first lens unit, the second lens unit, the third lens unit, and the fourth lens unit are arranged in order from an object side to an image side,
wherein the following conditions are satisfied:

$$10.0 < f3/fw < 26.0$$

$$1.2 < bft/fw < 3.5$$

where fw is a focal length of the zoom lens system at a wide-angle end, f3 is a focal length of the third lens unit, and bft is an equivalent air distance of a back focus at a telephoto end; and
an aperture stop which does not move for zooming,
wherein the first lens unit does not move for zooming, and
wherein the following condition is satisfied:

$$2.0 < OAL/OALs < 2.8$$

where OAL is a distance between one of lens surfaces included in the zoom lens system that is closest to the object side and an image plane and OALs is a distance between the aperture stop and the image plane.

13. A zoom lens system comprising:
a first lens unit having a positive optical power;
a second lens unit having a negative optical power, wherein the second lens unit moves during zooming;
a third lens unit having a positive optical power, wherein the third lens unit does not move for zooming; and
a fourth lens unit having a positive optical power, wherein the fourth lens unit moves during zooming,
wherein the first lens unit, the second lens unit, the third lens unit, and the fourth lens unit are arranged in order from an object side to an image side,
wherein the following conditions are satisfied:

$$10.0 < f3/fw < 26.0$$

$$1.2 < bft/fw < 3.5$$

where fw is a focal length of the zoom lens system at a wide-angle end, f3 is a focal length of the third lens unit, and bft is an equivalent air distance of a back focus at a telephoto end, wherein the first lens unit consists of a cemented lens including a negative meniscus lens element that is convex on the object side and a positive lens element, a positive meniscus lens element that is convex on the object side, a positive meniscus lens element that is convex on the object side, which are arranged in order from the object side to the image side, wherein the second lens unit consists of a negative meniscus lens element that is convex on the object side, and a cemented lens including a biconcave negative lens element and a positive lens element that is convex on the object side, which are arranged in order from the object side to the image side, and wherein the fourth lens unit consists of a biconvex positive lens element, and a cemented lens including a negative meniscus lens element that is convex on the object side and a biconvex positive lens element, which are arranged in order from the object side to the image side.

* * * * *